United States Patent
Katsumata et al.

(10) Patent No.: US 8,199,208 B2
(45) Date of Patent: Jun. 12, 2012

(54) OPERATION INPUT APPARATUS, OPERATION INPUT METHOD, AND COMPUTER READABLE MEDIUM FOR DETERMINING A PRIORITY BETWEEN DETECTED IMAGES

(75) Inventors: Shunsuke Katsumata, Kanagawa (JP); Yosuke Hiratsuka, Tokyo (JP); Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 12/534,386

(22) Filed: Aug. 3, 2009

(65) Prior Publication Data

US 2010/0073497 A1    Mar. 25, 2010

(30) Foreign Application Priority Data

Sep. 22, 2008  (JP) .................... 2008-242609

(51) Int. Cl.
*H04N 5/232* (2006.01)
(52) U.S. Cl. ............. 348/211.99; 382/118; 396/263; 340/5.53
(58) Field of Classification Search .......... 348/78, 348/208.99, 211.99, 222.1, 239, 376; 382/117, 382/118; 396/263; 340/5.1, 5.52, 5.53, 5.82, 340/5.83
See application file for complete search history.

(56) References Cited

U.S. PATENT DOCUMENTS

| | | | |
|---|---|---|---|
| 6,996,340 B2 * | 2/2006 | Yamaguchi et al. | 396/263 |
| 7,783,186 B2 * | 8/2010 | Ishiwata et al. | 396/123 |
| 7,986,346 B2 * | 7/2011 | Kaneda et al. | 348/222.1 |
| 2005/0219395 A1 * | 10/2005 | Sugimoto | 348/333.12 |
| 2007/0019943 A1 * | 1/2007 | Sueyoshi et al. | 396/287 |
| 2008/0056542 A1 * | 3/2008 | Hung et al. | 382/118 |
| 2008/0122939 A1 * | 5/2008 | Hirai | 348/222.1 |
| 2008/0187185 A1 * | 8/2008 | Misawa et al. | 382/118 |
| 2008/0204564 A1 * | 8/2008 | Yumiki | 348/208.99 |
| 2008/0205866 A1 * | 8/2008 | Sakamoto | 396/5 |
| 2008/0219515 A1 * | 9/2008 | Namgoong | 382/117 |
| 2009/0018419 A1 * | 1/2009 | Torch | 600/318 |
| 2009/0079844 A1 * | 3/2009 | Suzuki | 348/222.1 |

FOREIGN PATENT DOCUMENTS

JP    2008-72183    3/2008

* cited by examiner

*Primary Examiner* — Tuan Ho
*Assistant Examiner* — Kent Wang
(74) *Attorney, Agent, or Firm* — Oblon, Spivak, McClelland, Maier & Neustadt, L.L.P.

(57) ABSTRACT

An operation input apparatus includes a body portion detection unit for receiving image data and detecting a certain body portion of a subject in an image of the image data, a state determination unit for determining a certain state corresponding to a priority-level setting condition for each body portion, a priority-level setting unit for setting priority levels to the individual body portions in accordance with results of the determination, an operation determination unit for determining whether the body portions performed a predetermined motion corresponding to a certain operation in accordance with determination allowance degrees of the body portions serving as determination subjects which are set in accordance with the priority levels, and a control unit for controlling the operation input apparatus so that the operation input apparatus performs a predetermined operation in accordance with the determination that the certain motion corresponding to the certain operation has been performed.

17 Claims, 21 Drawing Sheets

FACE A: HIGH
FACE B: LOW

FACE A: LOW
FACE B: HIGH

FACE A: LOW
FACE B: HIGH

FACE A: HIGH
FACE B: LOW

FACE A: HIGH
FACE B: LOW

FACE A: PRIORITY LEVEL 20
(RECOGNITION)
FACE B: PRIORITY LEVEL 0
(RECOGNITION)

FACE A: PRIORITY LEVEL 70
(RECOGNITION)
FACE B: PRIORITY LEVEL 0
(RECOGNITION)

FACE A: PRIORITY LEVEL 120
(RECOGNITION)
FACE B: PRIORITY LEVEL 0
(NON-RECOGNITION)

FACE A: PRIORITY LEVEL 100
(RECOGNITION)
FACE B: PRIORITY LEVEL 20
(NON-RECOGNITION)

FACE A: PRIORITY LEVEL 150
    (RECOGNITION)
FACE B: PRIORITY LEVEL 20
    (NON-RECOGNITION)

FACE A: PRIORITY LEVEL 150
    (RECOGNITION)
FACE B: PRIORITY LEVEL 20
    (NON-RECOGNITION)

FACE A: PRIORITY LEVEL 0
    (RECOGNITION)
FACE B: PRIORITY LEVEL 20
    (RECOGNITION)

OPERATION INPUT APPARATUS, OPERATION INPUT METHOD, AND COMPUTER READABLE MEDIUM FOR DETERMINING A PRIORITY BETWEEN DETECTED IMAGES

BACKGROUND OF THE INVENTION

1. Field of the Invention

The present invention relates to an operation input apparatus which executes certain processing in response to an operation input, for example, and a method therefor. Furthermore, the present invention relates to a program executed by the operation input apparatus.

2. Description of the Related Art

Japanese Unexamined Patent Application Publication No. 2008-72183 discloses a photographing apparatus configured such that a still image is captured by releasing a shutter when a motion in which one of opened eyes is closed, and thereafter, both eyes are opened again is detected. In this way, a photographer takes a photograph at a desired timing by remote control.

SUMMARY OF THE INVENTION

It is desirable to operate apparatuses such as imaging apparatuses by remote control by predetermined operations of persons who are photographed, for example. Furthermore, it is desirable to provide such an apparatus having high practicality and high usability.

In order to address the above problem, an operation input apparatus having the following configurations is provided.

According to an embodiment of the present invention, there is provided an operation input apparatus including a body portion detection unit configured to receive image data obtained by image capturing and detect a certain body portion of a photographic subject in an image corresponding to the image data, a state determination unit configured to determine a certain state corresponding to a priority-level setting condition, when a plurality of body portions are detected using the body portion detection unit, for each body portion, a priority-level setting unit configured to set priority levels to the individual body portions in accordance with results of the determination performed by the state determination unit, an operation determination unit configured to determine whether the body portions detected by the body portion detection unit performed a predetermined motion corresponding to a certain operation in accordance with determination allowance degrees of the body portions serving as determination subjects which are set in accordance with the priority levels, and a control unit configured to control the operation input apparatus so that the operation input apparatus performs a predetermined operation in accordance with the determination that the certain motion corresponding to the certain operation has been performed which is made by the operation determination unit.

With this configuration, an operation corresponding to a motion of a specific body portion of a photographic subject included in image data obtained by image capturing is determined. In accordance with the determination of the motion corresponding to the operation, the operation input apparatus executes a predetermined operation. That is, a user can remotely control the apparatus by performing a motion of a body portion.

Then, priority levels are set in accordance with a predetermined state of the specific body portion, and when the motion corresponding to the operation is determined, an allowance degree in accordance with the priority level is reflected. By this, the motion of the specific body portion, among a plurality of body portions corresponding to portions of the photographic subject, is determined with ease and other body portion is determined with difficulty.

With this configuration, an imaging apparatus which can be remotely controlled by a motion of a subject and which has high practicality and high usability is obtained.

DESCRIPTION OF THE PREFERRED EMBODIMENTS

A best mode for carrying out the invention (hereinafter referred to as an "embodiment") will be described hereinafter in the following order.
1. Configuration of Digital Still Camera
2. Example of Facial Gesture Pattern
3. Example of Facial-Gesture Recognition Processing
4. Priority Level Setting
5. Example of Implementation
1. Configuration of Digital Still Camera FIG. 1 is a block diagram illustrating an example of an internal configuration of a digital still camera 1 according to an embodiment of the present invention.

Figure 1:
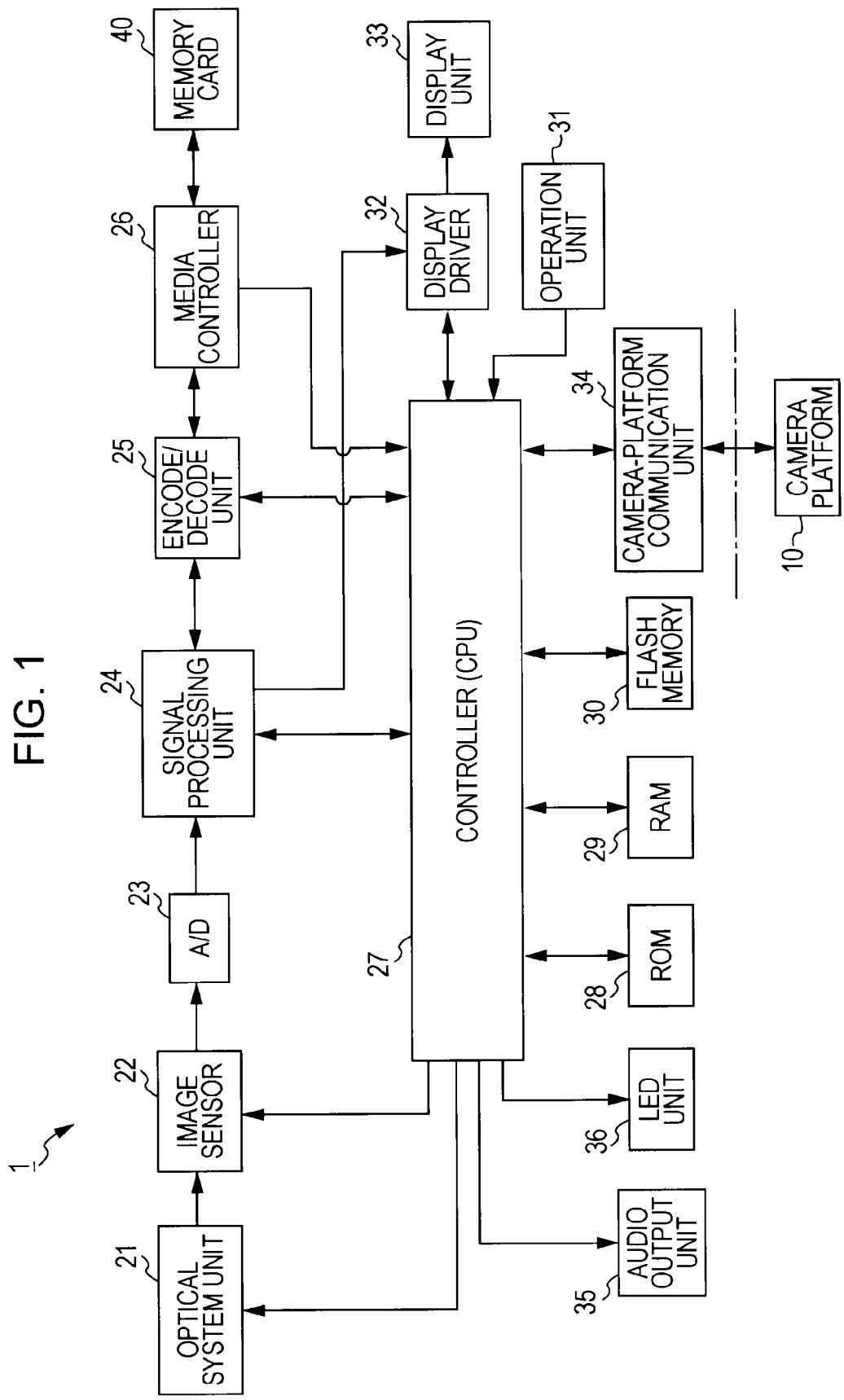
FIG. 1 is a block diagram illustrating an example of an internal configuration of a digital still camera according to an embodiment of the present invention.

In FIG. 1, an optical system unit 21 has an imaging lens group including a predetermined number of lenses such as a zoom lens and a focus lens and an aperture. The optical system unit 21 forms an image on a light-receiving plane of an image sensor 22 using incident light serving as imaging light.

The optical system unit 21 includes driving mechanism units configured to drive the zoom lens, the focus lens, and the aperture, for example. Operations of the driving mechanism units are controlled by so-called camera control such as zoom (field angle) control, automatic focus control, and automatic exposure control.

The image sensor 22 converts the imaging light obtained through the optical system unit 21 into an electric signal whereby so-called photoelectric conversion is performed. Specifically, the image sensor 22 receives the imaging light supplied from the optical system unit 21 by the light-receiving plane of photoelectric conversion element, and successively outputs signal charges stored in accordance with intensity of the received light at a predetermined timing. In this way, electric signals (imaging signals) corresponding to the imaging light are output. Note that the photoelectric element (imaging element) used as the image sensor 22 is not particularly limited. However, in recent years, a CMOS sensor or a CCD (Charge Coupled Device) sensor, for example, has been used. Note that, in a case where the CMOS sensor is used, the digital still camera is configured such that the CMOS sensor corresponding to the image sensor 22 includes an analog-to-digital convertor corresponding to an A/D convertor 23, which will be described hereinafter.

The imaging signals output from the image sensor 22 are input to the A/D convertor 23 which converts the imaging signals into digital signals, and further supplied to a signal processor 24.

The signal processor 24 receives digital imaging signals output from the A/D convertor 23 in a unit of one still image (frame image), for example, and performs certain signal processing on the imaging signals supplied in the unit of one still image so that captured-image data (captured-still-image data) which is image signal data corresponding to one still image is generated.

When the captured-image data generated using the signal processor 24 is to be recorded in a memory card 40, which is a storage medium, as image information, captured-image data corresponding to one still image is output from the signal processor 24 to an encode/decode unit 25.

The encode/decode unit 25 performs compression encoding on the captured-image data corresponding to one still image supplied from the signal processor 24 by a predetermined still-image compression encoding method and adds a header under control of a controller 27 so as to obtain compressed captured-image data having a predetermined format. The captured-image data thus generated is supplied to a media controller 26. The media controller 26 writes and stores the supplied captured-image data in the memory card 40 under control of the controller 27. In this case, the memory card 40 has an appearance like a card complying with a certain standard, for example, and serves as a storage medium configured to include a nonvolatile semiconductor storage element, such as a flash memory. Note that a type and a format other than those of the memory card may be employed in the storage medium for storing image data.

The signal processor 24 of this embodiment is capable of executing image processing (face detection processing) for detecting an image of a face which is a portion of a person serving as a photographic subject in an image corresponding to the captured-image data. The face detection processing of this embodiment will be described in detail hereinafter.

The digital still camera 1 is capable of displaying, in a display unit 33, a so-called through image which is an image being currently captured by performing display of an image corresponding to the captured-image data obtained using the signal processor 24. For example, the signal processor 24 obtains an imaging signal output from the A/D convertor 23 as described above and generates captured-image data corresponding to one still image. By repeatedly performing this operation, captured-image data items corresponding to frame images of a moving image are successively generated. Then, the captured-image data items successively generated are supplied to a display driver 32 under control of the controller 27. In this way, the through image is displayed.

The display driver 32 generates a driving signal used to drive the display unit 33 in accordance with the captured-image data supplied from the signal processor 24 as described above, and supplies the driving signal to the display unit 33. By this, the display unit 33 successively displays images based on the captured-image data items in a unit of a still image. From a user's standpoint, the images which are being captured are displayed as a moving image in the display unit 33. That is, a through image is displayed.

Furthermore, the digital still camera 1 is capable of reproducing captured-image data recorded in the memory card 40 and displaying an image corresponding to the captured-image data in the display unit 33.

To realize this operation, the controller 27 specifies captured-image data and instructs the media controller 26 to read the data from the memory card 40. In response to the instruction, the media controller 26 accesses an address in the memory card 40 indicating a portion where the specified captured-image data is recorded so as to read the data, and supplies the read data to the encode/decode unit 25.

The encode/decode unit 25, under control of the controller 27, extracts entity data serving as compressed still-image data from the captured-image data supplied from the media controller 26, and executes decoding processing on the compressed and encoded still-image data so as to obtain captured-image data corresponding to a single still image. Then, the encode/decode unit 25 supplies the captured-image data to the display driver 32. By this, an image corresponding to the captured-image data recorded in the memory card 40 is reproduced and displayed in the display unit 33.

The display unit 33 also displays an user interface image in addition to the through image and the reproduced image corresponding to the captured-image data. In this case, the controller 27 generates display image data corresponding to the user interface image in accordance with an operation state, for example, and supplies the display image data to the display driver 32. By this, the display unit 33 displays the user interface image. Note that the user interface image may be displayed in a display screen, such as a specific menu screen, in the display unit 33 separately from the through image and the reproduced image corresponding to the captured-image data, and may be displayed so as to overlap on a portion of the through image or the reproduced image corresponding to the captured-image data so as to be synthesized with the through image or the reproduced image.

The controller 27 includes a CPU (Central Processing Unit), for example, in practical use, and constitutes a microcomputer together with a ROM 28 and a RAM 29. The ROM 28 stores programs to be executed by the CPU of the controller 27 and various setting information items relating to operation of the digital still camera 1. The RAM 29 functions as a main storage device for the CPU.

Furthermore, a flash memory 30 functioning as a nonvolatile storage region used to store various setting information items which should to be changed (rewritten) in accordance with a user's operation or an operation history, for example, is included in the digital still camera 1. Note that, when a nonvolatile memory such as a flash memory is employed as the ROM 28, a partial storage region of the ROM 28 may function as the flash memory 30.

An operation unit 31 collectively represents various operators included in the digital still camera 1 and an operation-information-signal output section which generates an operation-information signal in accordance with an operation performed using one of the operators and which supplies the operation-information signal to the CPU. The controller 27 executes predetermined processing in accordance with the operation-information signal supplied from the operation unit 31. By this, an operation of the digital still camera 1 is executed in accordance with the user's operation.

The digital still camera 1 of this embodiment may be mounted on a camera platform 10 complying with the digital still camera 1. The camera platform 10 is capable of rotating relative to a rotation axis along a panning (lateral or horizontal) direction and a tilting (longitudinal or vertical) direction. With this configuration, when the camera platform 10 is moved in a state in which the digital still camera 1 is mounted thereon, a field of view of the digital still camera 1 is changed in the horizontal and vertical directions.

Then, in a state in which the digital still camera 1 is mounted on the camera platform 10, the digital still camera 1 communicates with the camera platform 10 through a wired or wireless manner. Therefore, the digital still camera 1 controls motion of the camera platform 10 by specifying a panning position and a tilting position.

A camera-platform communication unit 34 of the digital still camera 1 communicates with the camera platform 10 in accordance with a predetermined communication method. In a state in which the digital still camera 1 is mounted on the camera platform 10, for example, the camera-platform communication unit 34 has a physical layer configuration which enables transmission of a communication signal to and reception of a communication signal from a communication unit of the camera platform 10 in a wired or a wireless manner and a configuration of a certain layer higher than the physical layer which realizes communication processing.

An audio output unit 35 outputs electric sound of predetermined tone and predetermined voice patterns under control of the controller 27.

A LED unit 36 includes a LED (Light Emitting Diode) disposed on a front surface of a case of the digital still camera 1, for example, and a circuit unit which drives the LED so as to turn the LED on or off under control of the controller 27.

Note that examples of the appearance of the camera platform 10 for the digital still camera 1 of this embodiment are shown in FIGS. 24 to 29.

Figure 24:
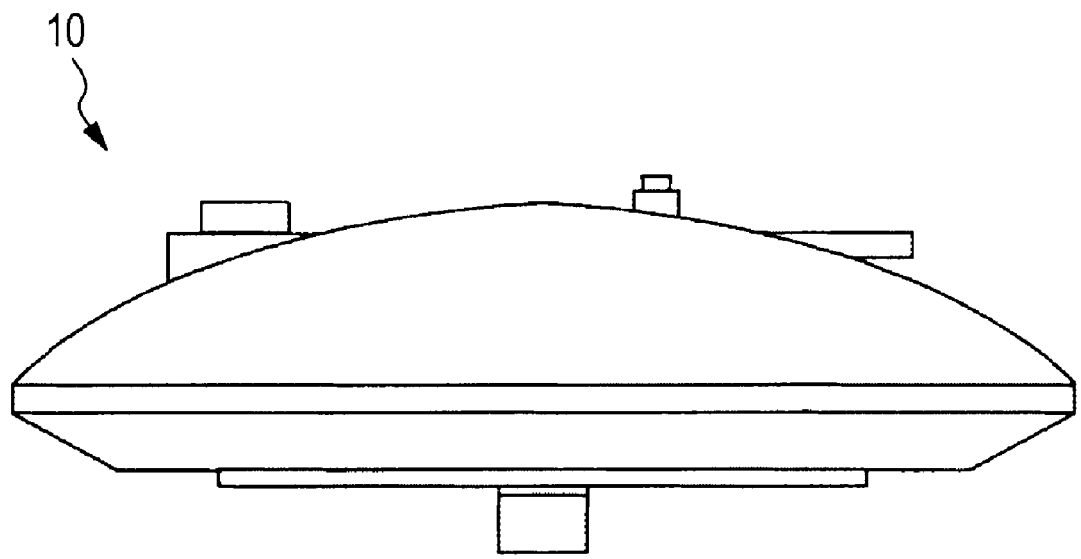
FIG. 24 is a front view illustrating a camera platform complying with the digital still camera of the embodiment.
Figure 25:
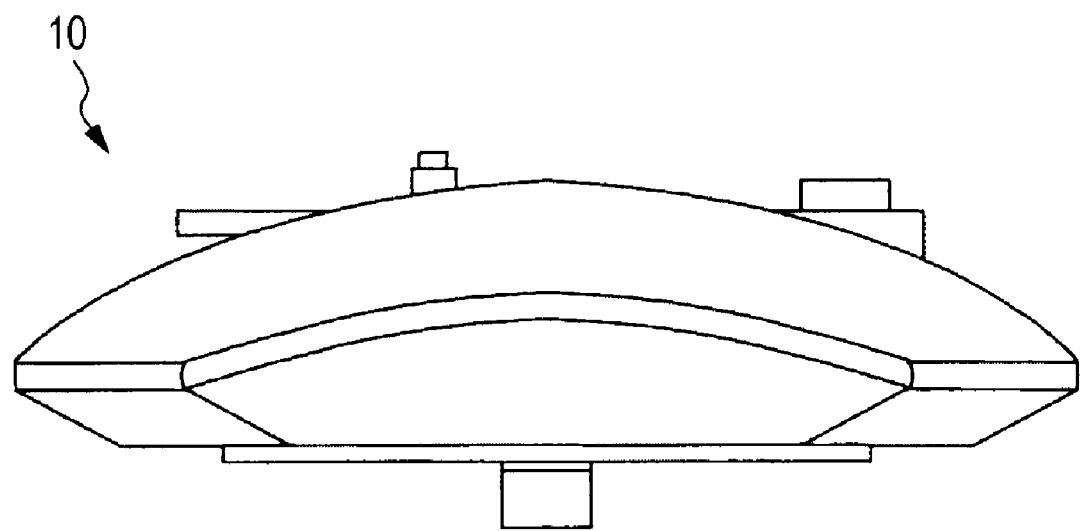
FIG. 25 is a back view illustrating a camera platform complying with the digital still camera of the embodiment.
Figure 26:
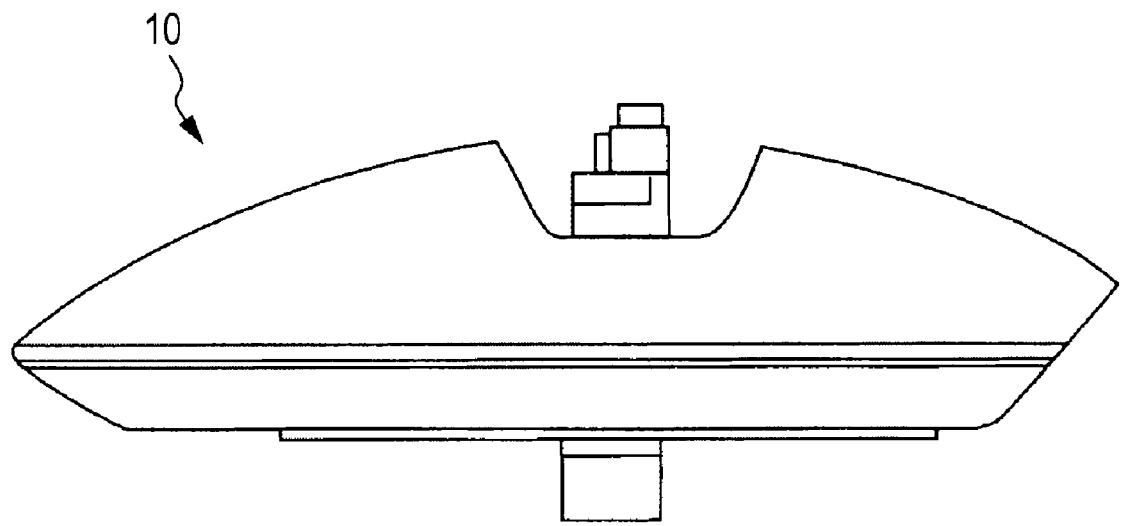
FIG. 26 is a left view illustrating a camera platform complying with the digital still camera of the embodiment.
Figure 27:
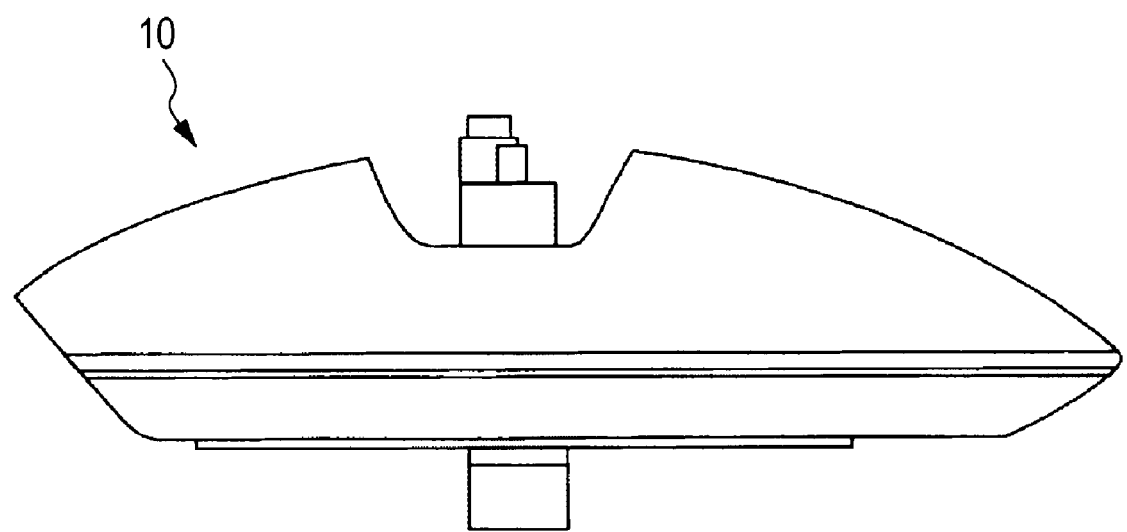
FIG. 27 is a right view illustrating a camera platform complying with the digital still camera of the embodiment.
Figure 28:
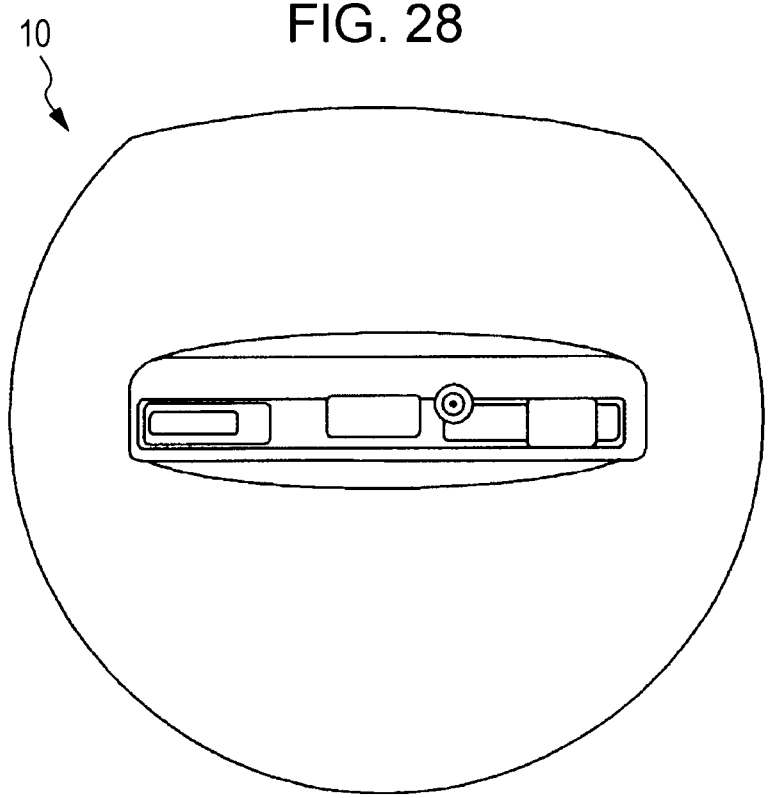
FIG. 28 is a plan view illustrating a camera platform complying with the digital still camera of the embodiment.
Figure 29:
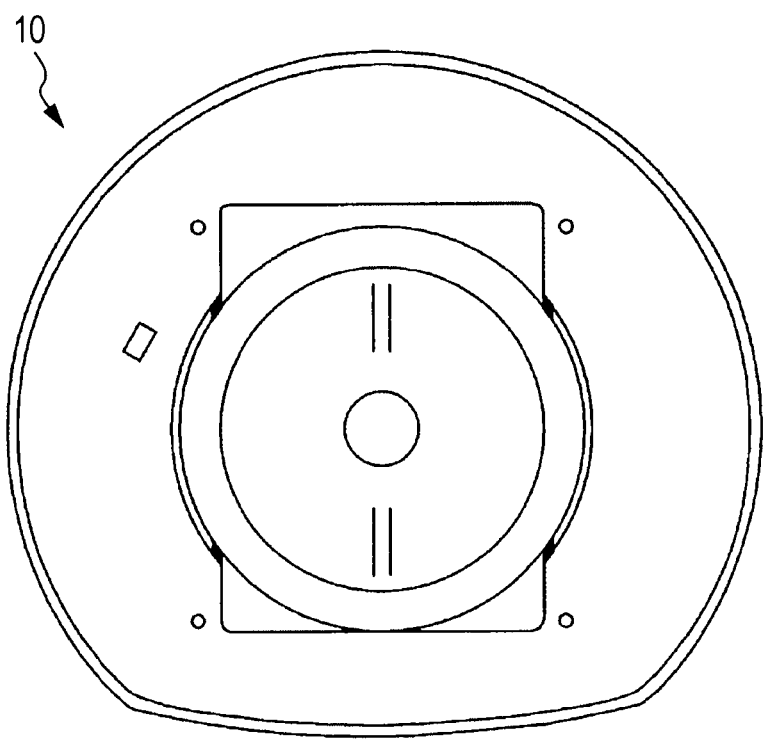
FIG. 29 is a bottom view illustrating a camera platform complying with the digital still camera of the embodiment.

FIG. 24 is a front view of the camera platform 10. FIG. 25 is a back view of the camera platform 10. FIG. 26 is a left view of the camera platform 10. FIG. 27 is a right view of the camera platform 10. FIG. 28 is a plan view of the camera platform 10. FIG. 29 is a bottom view of the camera platform 10.

2. Examples of Facial Gesture Pattern

The digital still camera 1 of this embodiment executes a predetermined operation in accordance with a pattern of a change of a face image detected in a captured image. Specifically, when the user attempts to capture a face of the user using the digital still camera 1, the user can remotely control the operation of the digital still camera 1 by changing a facial expression to a predetermined pattern, for example, by winking or inclining the face.

Note that, hereinafter, the change of the facial expression for remote control of the operation of the digital still camera 1 is referred to as a "facial gesture".

Figure 2:
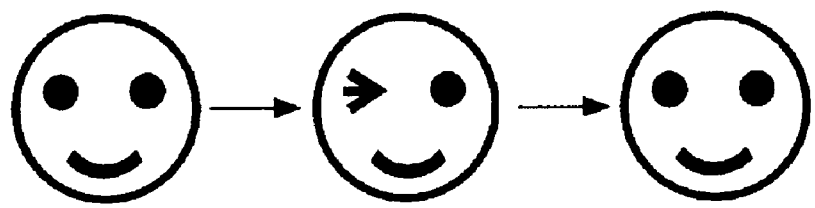
FIG. 2 is a diagram illustrating an example of a facial gesture pattern corresponding to a specific operation.
Figure 3:
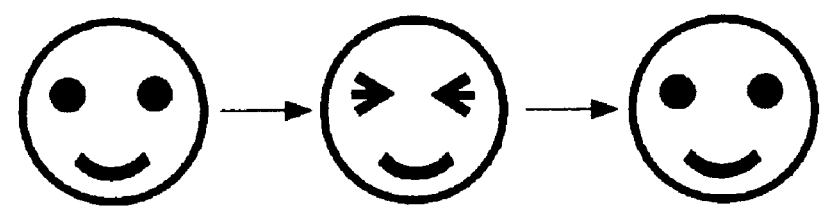
FIG. 3 is a diagram illustrating an example of a facial gesture pattern corresponding to a specific operation.
Figure 4:
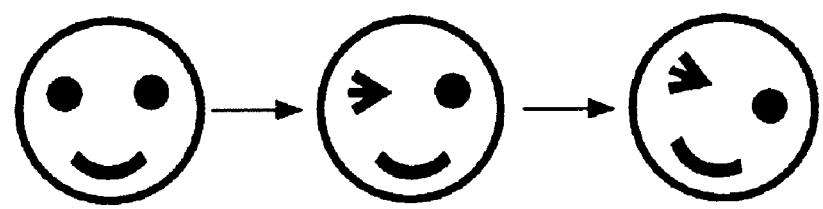
FIG. 4 is a diagram illustrating an example of a facial gesture pattern corresponding to a specific operation.

To understand the facial gesture, examples of patterns of the facial gesture (facial gesture patterns) are shown in FIGS. 2 to 4.

FIGS. 2 to 4 are diagrams schematically illustrating face images of the user (operator) performing a remote control operation.

FIG. 2 shows a facial gesture pattern in which a state in which both the eyes of the operator are open is changed to a state in which one of the eyes (the right eye in this case) of the operator is closed, and then, to a state in which the closed eye of the operator is opened again so that both the eyes are opened.

FIG. 3 shows a facial gesture pattern in which a state in which both the eyes of the operator are open is changed to a state in which both the eyes are closed, and then, to a state in which both the eyes are opened again.

FIG. 4 shows a facial gesture pattern in which a state in which both the eyes are open while the face is not inclined, that is, the face erects upward, is changed to a state in which one of the eyes (the right eye in this case) is closed, and then, to a state in which the face is inclined leftward (toward the observer's right) with the eye closed.

For example, as shown in FIGS. 2 to 4, it is considered that a facial gesture includes elements of simple motions (states), such as a motion in which both the eyes are opened, a motion in which one of the eyes is closed, a motion in which both the eyes are closed, and a motion in which the face is inclined. A facial gesture pattern includes at least one of the simple motion elements. In a case where a facial gesture pattern includes a plurality of simple motion elements, the simple motion elements are combined with one another in accordance with a predetermined rule.

Then, predetermined operations to be performed by the digital still camera 1 are assigned to individual facial gesture patterns thus generated. That is, a certain facial gesture pattern corresponds to a command code representing a certain command to be transmitted from a remote control apparatus.

Note that the simple motions are referred to as "unit commands" since the simple motions serve as minimum units constituting a facial gesture pattern, i.e., a command.

Examples of an operation to be performed by remote control using such a facial gesture include recording of a captured image as a still image, self-timer recording, continuous shooting recording, start and stop of recording of a captured image as a moving image, and turning on or off of a flash.

Furthermore, as will be described hereinafter, priority levels to be assigned to facial gestures for individual face images are deliberately set high depending on the facial gestures. In this way, operations which are not directly associated with the motions relating to image capturing of the digital still camera 1 are performed.

3. Example of Facial-Gesture Recognition Processing

Next, examples of facial-gesture-pattern recognition processing performed by the digital still camera 1 will be described with reference to FIGS. 5 to 7.

Note that a case where the facial gesture pattern shown in FIG. 2 corresponds to an operation command for performing image capturing using a self-timer will be described as an example.

The operator performs setting so that the face of the operator is included in a field of view for the image capturing of the digital still camera 1 and a direction of the face substantially corresponds to a front relative to an image-capturing direction (an optical axis of the optical system). In this case, both the eyes are normally open. Note that the operator may blink the eyes in the state in which both the eyes are normally open. In motion recognition processing of this embodiment, which will be described hereinafter, blinking and a close-and-open motion of the eyes as a conscious motion are distinguished from each other.

Figure 5:
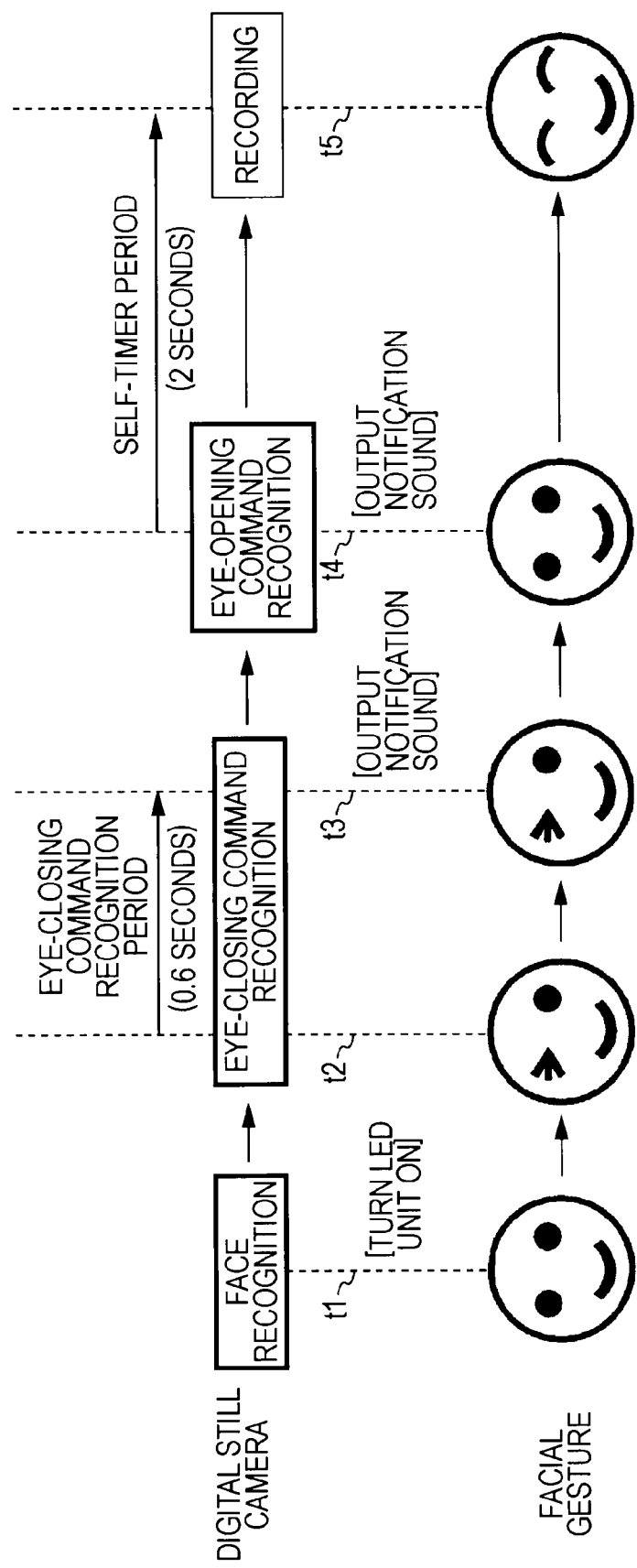
FIG. 5 is a diagram illustrating an example of facial-gesture-pattern recognition processing.

In accordance with the state of the operator, the digital still camera 1 normally recognizes an image of the face of the operator from captured-image data at a time point 1$t$ shown in FIG. 5. After the recognition of the face image, the LED of the LED unit 36 is turned on in order to notify the recognition of the face image to the operator. By this, the operator recognizes a fact that the digital still camera 1 has entered in a state in which the digital still camera 1 accepts a facial gesture of the operator as a command.

At a time point t2 after the time point t1 where the LED is turned on, the operator closes one of the operator's eyes for image capturing using the self-timer. The operator keeps closing one of the eyes for 0.6 seconds after one of the eyes is closed at the time point t1. Then, the digital still camera 1 recognizes that this motion in which one of the eyes is closed is a simple motion (state) element constituting a facial gesture pattern for remote control, that is, a unit command (eye-closing command). Then, at a time point t3, in response to the recognition of the eye-closing command, the digital still camera 1 outputs sound (notification sound) for notifying the operator of recognition of the eye-closing command from the audio output unit 35.

Note that the state in which one of the eyes is closed should be kept for 0.6 seconds or more for the recognition of the eye-closing command in this embodiment. In this way, this state is distinguished from a state in which the eyes are closed due to blinking so that the blinking is prevented from being misrecognized as the eye-closing command. Note that it is determined that a period of 0.6 seconds is appropriate for the recognition of the eye-closing command (an eye-closing-command recognition period) since 0.6 after reviewing the eye-closing-command recognition period by the inventor of this application. However, the period of 0.6 seconds is merely an example, and a period of time suitable for the eye-closing-command recognition period is not limited to this.

When hearing the notification sound output at the time point t3 as described above, the operator recognizes the fact that the eye-closing motion of the operator is accepted as a unit command. Thereafter, the operator opens the eye which has been closed as a unit command constituting the facial gesture pattern.

When the eye is opened, the digital still camera 1 recognizes that this motion in which the eye is opened is a unit command (eye-opening command) constituting the facial gesture pattern for the remote control, as will be described with reference to FIG. 7. In response to this, as with the case at the time point t3, the digital still camera 1 outputs notification sound at a time point t4. At this stage in which the facial gesture has been performed, the digital still camera 1 determines that the facial gesture pattern is constituted by a combination of the unit commands as shown in FIG. 2, that is, a combination of the unit command represented by the state in which both the eyes are open, the unit command represented by the state in which one of the eyes is closed, and the unit command represented by the state in which both the eyes are opened. That is, in accordance with a result of the determination, the digital still camera 1 determines that an operation input of the image capturing using the self-timer has been performed at the time point t4.

Then, the digital still camera 1 stands by for a certain period of time as a predetermined self-timer period (for example, two seconds) after the time point t4. In this period, the operator can prepare for the image capturing using the self-timer by posing for the digital still camera 1. At a time point t5 in which the self-timer period is terminated, an operation for recording a captured image as a still image is performed.

Figure 6:
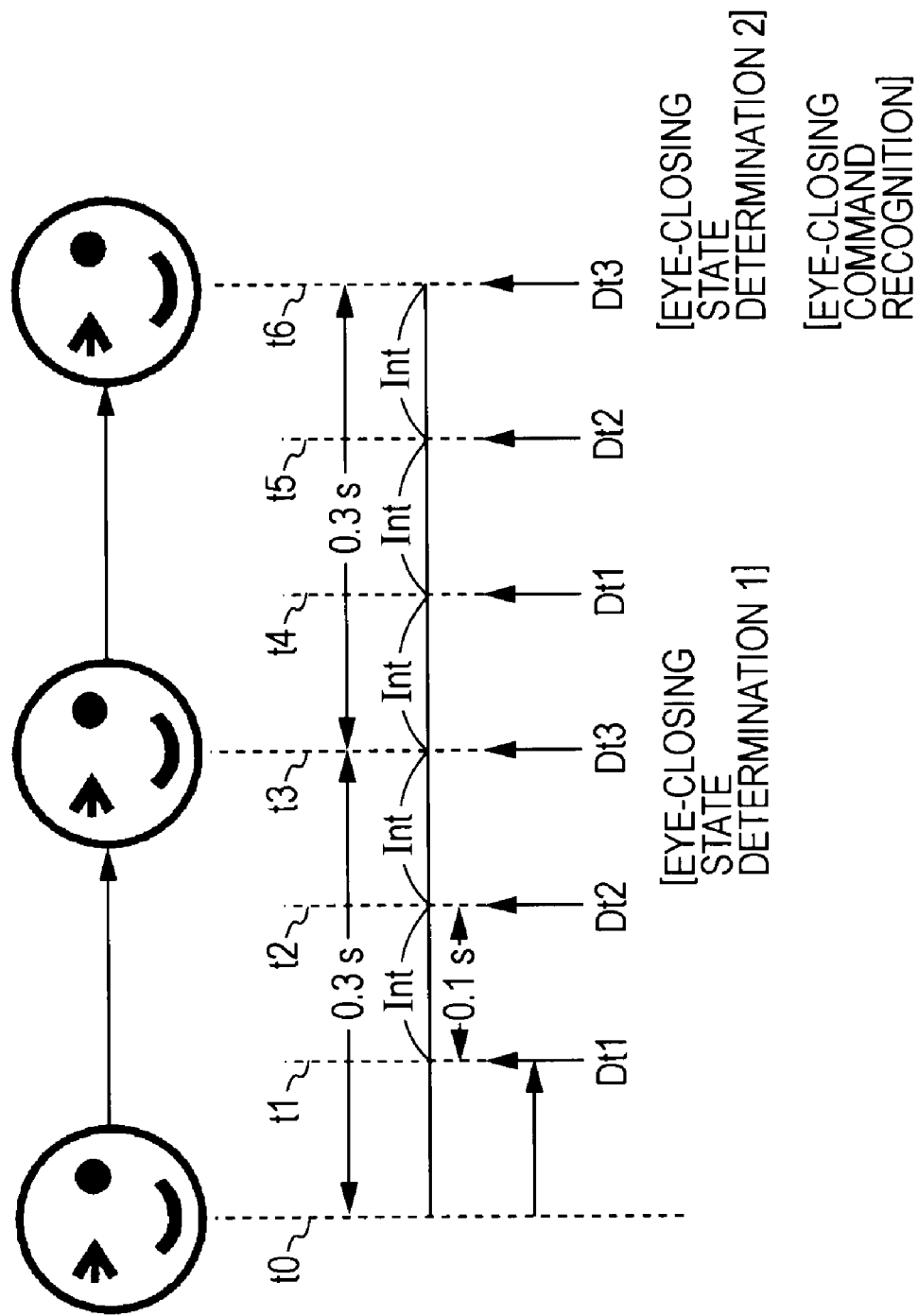
FIG. 6 is a diagram illustrating an example of processing for recognizing an eye-closing command in a facial gesture pattern.

FIG. 6 is a diagram illustrating detection processing performed for recognizing an eye-closing command in the eye-closing-command recognition period.

It is assumed that the operator closes one of the operator's eyes at a time point t0. Note that the digital still camera 1 detects a state of the face (face state) corresponding to a facial gesture with detection time intervals int of 0.1 seconds. Furthermore, three consecutive detections of the face state with the intervals of 0.1 seconds are determined to be one set of detections. That is, one set of detections includes, as shown in FIG. 6, a first detection timing Dt1, a second detection timing Dt2 performed 0.1 seconds after the first detection timing Dt1, and a third detection timing Dt3 performed 0.1 seconds after the second detection timing. This set of detections is repeatedly performed.

In this case, the time point t1 0.1 seconds after the time point t0, and the subsequent time points t2 and t3 are determined as a first set of detections. For the determination of the eye-closing command, first, when it is determined that the face state is "eye-closing" representing that one of the operator's eyes is closed at two or more of the three detection timings included in the first set of detections, it is determined that the eye state is an eye-closing state. Specifically, in the case of FIG. 6, a first result of the determination representing the eye-closing state is obtained at the time point t3 (first eye-closing state determination).

After the first set of detections including the time points t1 to t3, the face state is detected in a subsequent second set of detections including a time point t4 0.1 seconds after the time point t3 and subsequent time points t5 and t6. In this case of FIG. 6, it is determined that the face state is "eye-closing" at two or more of the three detection timings t4 to t6 included in the second set of detections, and a second result of the determination representing the eye-closing state is obtained (second eye-closing state determination).

A condition to recognize the eye-closing command is to obtain results of the determination representing the eye-closing state of at least consecutive two sets. Therefore, in the case of FIG. 6, the eye-closing command is recognized at the time point t6 (eye-closing command determination).

The inverter et al. have been recognized that it is determined that the eye-closing state is barely detected at two consecutive timings when the operator blinks the eyes. By performing the processing for recognizing the eye-closing command, in this embodiment, a motion of one of the operator's eyes which is purposely performed and which corresponds to the eye-closing command and a motion of the operator's eyes which is unconsciously performed for a short period of time and which corresponds to blinking can be substantially reliably distinguished from each other.

Figure 7:
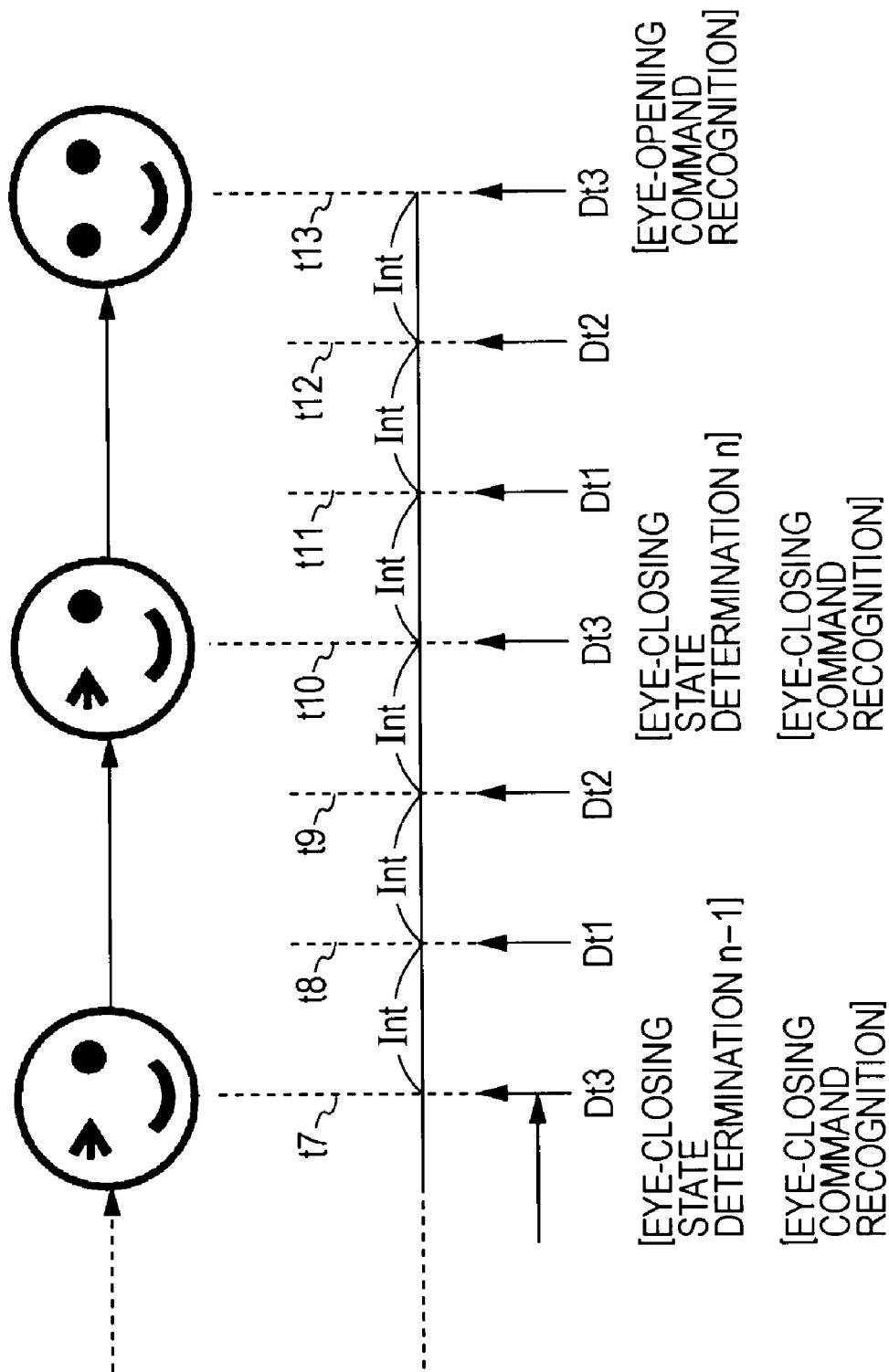
FIG. 7 is a diagram illustrating an example of processing for recognizing an eye-opening command in a facial gesture pattern.

FIG. 7 is a diagram illustrating an example of processing for recognizing an eye-opening command after the eye-closing command is recognized as shown in FIG. 6.

In FIG. 7, a time point t7 comes a certain period of time after the time point t6 shown in FIG. 6. The state in which one of the operator's eyes is closed which is still kept at the time point t6 is still further kept at the time point t7.

Furthermore, the time point t7 corresponds to a third detection timing Dt3 of one set of detections, and accordingly, it is determined that the (n−1)th eye-closing state is detected at the time point t7. Here, it is recognized that the eye-closing command first recognized at the time point t6 is still effective.

Furthermore, since the state in which one of the operator's eyes is closed is kept in the next set of detections including time points t8 to t10 following the time point t7, it is determined that the n-th eye-closing state is detected at the time point t10. Therefore, also at the time point t10, it is recognized that the eye-closing command first recognized at the time point t6 is still effective.

In the next set of detections (at time points t11 to t13) following the time point t10, it is recognized that one of the eyes is closed at detection timings Dt1 and Dt2 corresponding to the time points t11 and t12, and it is recognized that the eye which has been closed is opened, that is, both the operator's eyes are open immediately after the time point 12. Then, at a detection timing Dt3 corresponding to the time point t13, it is determined that both the eyes are open as the face state.

As for the eye-opening command, if a state in which both the eyes are open is detected at at least one of the three detection timings in the set of detections including the time points t11 to t13, the set of detections is recognized as the eye-opening command.

As described above, the eye-closing command is recognized when two consecutive sets of detections in which the eye-closing state is detected at at least consecutive two of the detection timings is detected.

On the other hand, the eye-opening command is recognized when one set of detections in which the eye-opening state is detected at at least one of the detection timings is detected. The inventor et al. confirmed that the eye-opening command can be recognized with high accuracy even under the condition of FIG. 7 when the above condition is set. Accordingly, since a period of time for recognizing the eye-opening command is short, a response speed of the digital still camera 1 in response to the command using the facial gesture becomes short.

4. Priority Level Setting

In the facial-gesture-recognition processing performed by the digital still camera 1, if one face image is detected in the image frame of the captured image, only the face image is to be recognized, which is simple.

However, if a plurality of photographic subjects are captured, and therefore, a plurality of face images are detected in an image frame, the following problem arises.

As described above with reference to FIG. 2, components (unit commands) constituting a facial gesture pattern according to this embodiment includes a motion in which one of the eyes is closed, a motion in which both the eyes are open, and a motion in which the face is inclined. However, it is possible that people may unconsciously perform these motions. Therefore, if a person who is being photographed except for the operator unconsciously perform a motion corresponding to a certain facial gesture corresponding to a certain operation, it is possible that the digital still camera 1 operates in response to the facial gesture. That is, if a plurality of persons are photographed, it is possible that one of the persons except for the operator unconsciously operates the digital still camera 1 by performing such a motion, and an undesired operation is performed by the digital still camera 1, which is inconvenient. Therefore, in this embodiment, the disadvantage is addressed as follows.

That is, if a plurality of face images are detected in the image frame of the captured image, the digital still camera 1 of this embodiment assigns priority levels (priority order) to the face images in accordance with the following conditions. Furthermore, a degree of facilitation of determination or recognition of an operation using the facial gesture (determination allowance degree) for each face image can be changed in accordance with a set priority level.

Referring to FIGS. 8 to 12, examples of conditions for evaluating priority levels of face images detected in an image frame (priority-level setting conditions) will be described. Note that, in FIGS. 8 to 12, for simplicity of description, a case where two face images are detected in an image frame 300 will be described as an example.

Figure 8:
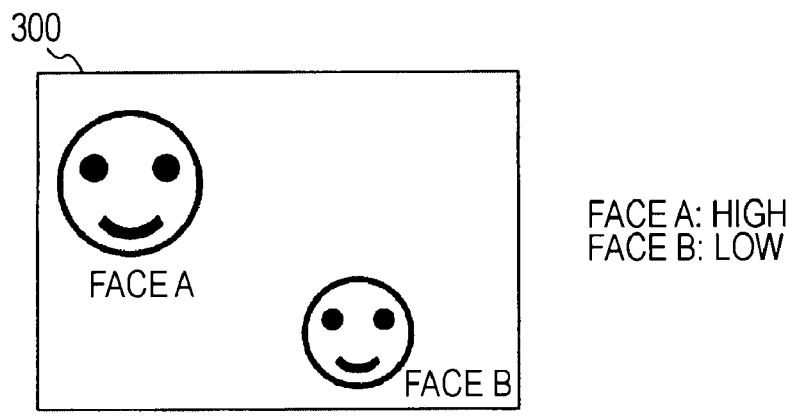
FIG. 8 is a diagram illustrating an example of priority level setting in a case where a subject distance in accordance with a face size is set as a priority-level setting condition.

In the image frame 300 shown in FIG. 8, two face images A and B are detected. The face image A is larger than the face image B in the image frame 300. For example, for simplicity of description, it is assumed that actual faces corresponding to the face images A and B have the same sizes. In this case, in FIG. 8, the face image A which is larger than the face image B has a subject distance smaller than that of the face image B, that is, the face corresponding to the face image A is located nearer to the digital still camera 1 than the face image B. The subject distance means a distance between the digital still camera 1 to a photographic subject. It is highly possible that, among the plurality of persons corresponding to the face images (photographic subjects), the operator positions nearer to the digital still camera 1. Therefore, in this embodiment, as a first condition of the priority-level setting, the smaller the subject distance is, that is, the larger the face image in the image frame 300 is, the higher an assigned priority level is. In the case of FIG. 8, the face image A has a priority level higher than that of the face image B.

However, in practical use, there is a possibility that subjects (faces) included in an image frame may be an adult and a child, or a man and a woman. In general, faces of adults are larger than those of children, and faces of men are larger than those of women. In a case where such various types of faces are included in combination, if priority levels are set only in accordance with sizes of the face images included in the image frame without taking a difference of actual face sizes into consideration, it is possible that correct subject distances are not reflected.

Therefore, when the priority levels are set in accordance with the sizes of the face images included in the face frame, as will be described hereinafter, the face sizes are modified and normalized in accordance with features such as ages and genders of the faces corresponding to the detected face images, and priority levels in accordance with subject distances are set on the basis of the modified sizes of the face images.

Figure 9:
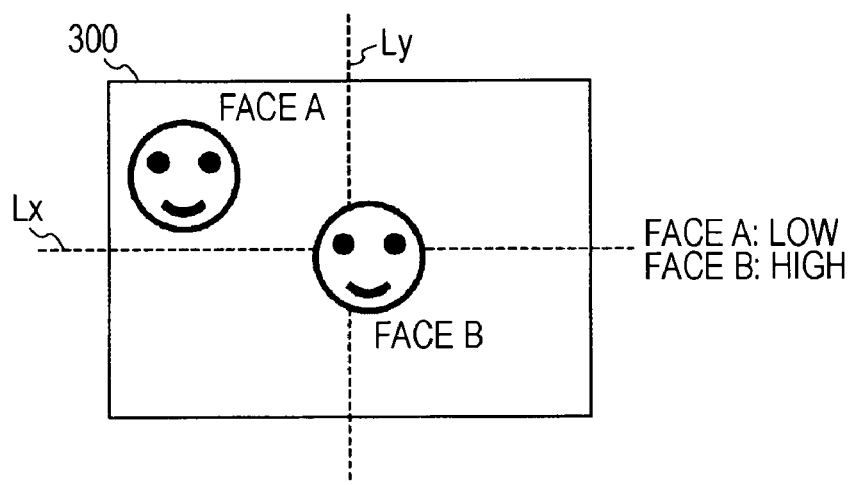
FIG. 9 is a diagram illustrating another example of the priority level setting in a case where a distance between the center of an image frame and a face image is set as a priority-level setting condition.

In the image frame 300 shown in FIG. 9, a virtual division line Ly which perpendicularly passes the center of a horizontal width and a virtual division line Lx which perpendicularly passes the center of a vertical height are shown. Here, an intersection point of the division lines Ly and Lx is determined to be the center of the image frame 300.

In this embodiment, as a face image is nearer to the center of the image frame 300, it is highly possible that the face image corresponds to the face of the operator. Therefore, as for positions of the face images included in the image frame 300, higher priority levels are assigned to face images nearer to the center of the image frame 300.

In the case of FIG. 9, since the face image B is nearer to the center of the image frame 300 than the face image A, a priority level assigned to the face image B is higher than that assigned to the face image A.

For example, in a case where a face detected in an image frame is observed for certain consecutive frame periods, a change of a position of the face image in the image frame, that is, a movement of the face can be detected.

Figure 10:
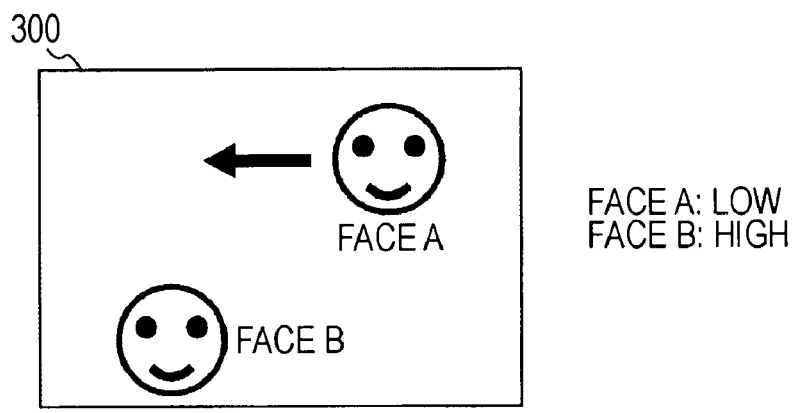
FIG. 10 is a diagram illustrating still another example of the priority level setting in a case where a motion speed of a face image in an image frame is set as a priority-level setting condition.

In FIG. 10, as a result of this movement detection, among the face images A and B detected in the image frame 300, the face image B has remained stationary whereas the face image A has been moved.

As for this movement of the face image corresponding to the face (subject), it is highly possible that a face corresponding to a face image in which the movement thereof is smaller corresponds to the face of the operator. Therefore, as for the movement of the face image, the smaller the movement of the face image is, the higher the priority level is. In the case of FIG. 10, a priority level assigned to the face image B is higher than that assigned to the face image A.

Figure 11A:
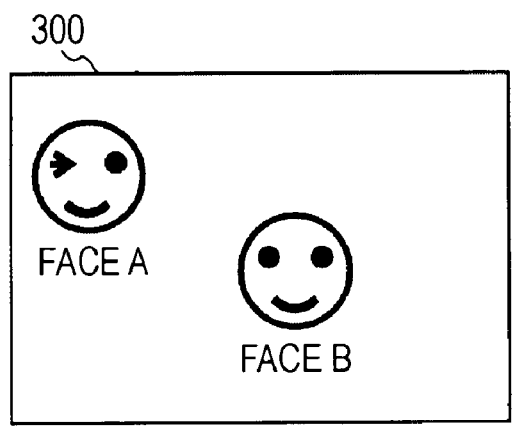
FIGS. 11A and 11B are diagrams illustrating a further example of the priority level setting in a case where a facial expression command is set as a priority-level setting condition.
Figure 11B:
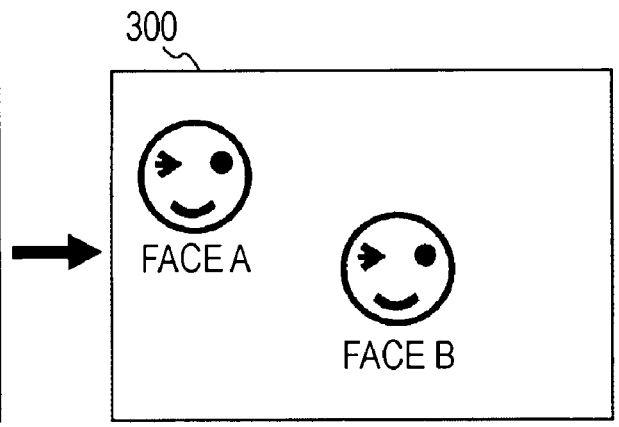

FIG. 11A shows images included in the image frame 300 obtained at a certain time, and FIG. 11B shows images included in the image frame 300 a certain period of time after the certain time of FIG. 11A.

In FIG. 11A, a state of the face image A in which both the eyes are open is changed to a state in which one of the eyes (right eye in this embodiment) is closed whereas a state of the face image B in which both the eyes are open is has not been changed. In FIG. 11B, the state of the face image B shown in FIG. 11A in which one of the eyes is closed remains a certain period of time after the images of FIG. 11A are obtained.

For example, in accordance with the conditions described with reference to FIGS. 8 to 10, in order to assign the highest priority level to the face image of the operator, normally, the operator moves nearer to digital still camera 1 than other people to be photographed, the operator moves so as to be photographed at a position nearer to the center of the image frame than other people to be photographed, or the operator stays still as much as possible. In an example of the priority-level setting shown in FIGS. 11A and 11B, an active facial motion of the operator is requested.

That is, in the example of FIGS. 11A and 11B, first, an operation corresponding to a predetermined facial gesture is determined as a preferential motion. Then, a high priority level is assigned to a face image which first performed the facial gesture corresponding to a preferential motion in a time-series manner.

Specifically, for example, in FIGS. 11A and 11B, the preferential motion corresponds to a facial gesture in which one of the eyes is closed. Therefore, in a case of FIGS. 11A and 11B, although both the face images A and B have facial gestures in which one of the eyes is closed, the face corresponding to the facial image A performs a motion in which one of the eyes is closed earlier than the face corresponding to the facial image B. Accordingly, a high priority level is assigned to the face image A.

Figure 12:
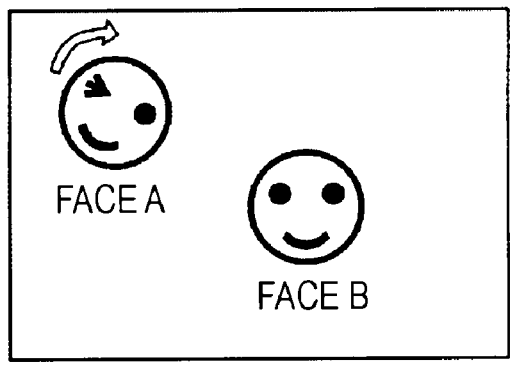
FIG. 12 is a diagram illustrating a still further example of the priority level setting in a case where another facial expression command is set as a priority-level setting condition.

In FIG. 12, although both the eyes of the face image B, among the face images A and B detected in the image frame 300, are open and a facial gesture is not particularly performed whereas one of the eyes (right eye in this embodiment) of the facial image A is closed, and a facial gesture is performed by inclining the face leftward.

Also in this example shown in FIG. 12, an active facial motion of the operator is requested as a condition. That is, in the example shown in FIG. 12, a high priority level is assigned to a face image which first performed a predetermined facial gesture pattern determined as a preferential motion.

In the case of FIG. 12, the facial gesture pattern in which the face is inclined leftward while one of the eyes is closed is determined to be the preferential motion. Therefore, in the case of FIG. 12, a high priority level is assigned to the face image A.

Note that, in a case where the operator is requested to perform a facial gesture pattern as shown in FIG. 12, the operator has a stronger will to be an operator when compared with the case of FIGS. 11A and 11B.

Therefore, in the case of FIG. 12, for example, it is appropriate to assign a priority level higher than the case of FIG. 11 to the face image in which the facial gesture pattern corresponding to the preferential operation is performed.

Note that a common prerequisite is defined for the cases shown in FIGS. 8 to 12. That is, directions of the faces are the front, that is, the faces which face the imaging optical system of the digital still camera 1 from substantially the front are determined to be objects to which priority levels are assigned.

It is difficult to recognize facial gestures of faces facing directions other than the front. Therefore, the possibility that a face (of a person who is photographed) facing a direction other than the front corresponds to the operator is considerably low. Accordingly, in this embodiment, the prerequisite described above is set.

Examples of the priority-level setting in accordance with the conditions described with reference to FIGS. 8 to 12 will be described in detail with reference to FIGS. 13 and 14.

First, the facial gesture pattern of the face image A of FIG. 12 is determined as the preferential operation. Furthermore, as described with reference to FIG. 5, the facial gesture pattern constituted by a series of facial gesture commands, that is, a command representing that one of the eyes which had been open is closed and both the eyes are open again is determined to correspond to an operation for instructing image capturing using the self-timer. Next, among the face images A and B detected in the image frame, the face image A performs the facial gesture pattern shown in FIG. 12 so as to be a gesture-recognition object, and the face image A which is the gesture-recognition object performs the facial gesture pattern in accordance with the operation for instructing the image capturing using the self-timer.

FIGS. 13A to 14C show two face images A and B detected in the image frame 300 in a time-series manner in this order. Note that sizes of actual faces are the same as sizes of the face images A and B in this embodiment.

Figure 13A:
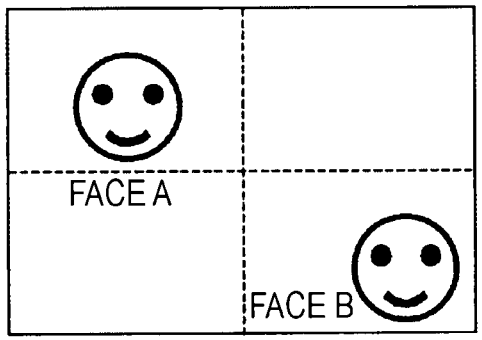
FIGS. 13A to 13D are diagrams illustrating concrete examples of the priority level setting in accordance with the priority-level setting conditions of FIGS. 8 to 12 in a time-series manner.

First, in FIG. 13A, both the eyes are open in the face images A and B. The sizes of the face images A and B are the same as each other, and accordingly, subject distances of the face images A and B are the same as each other. Furthermore, positions of the face images A and B are not changed.

In this case, priority levels are set in accordance with a condition of distances of the face images A and B relative to the center of the image frame. In FIG. 13A, the face image A is nearer to the center of the image frame than the face image B, and therefore, a priority level assigned to the face image A is higher than that assigned to the face image B.

Here, a priority level of 20 is assigned to the face image A and a priority level of 0 is assigned to the face image B. Note that the larger the value of the priority level is, the higher the set priority level is.

Figure 13B:
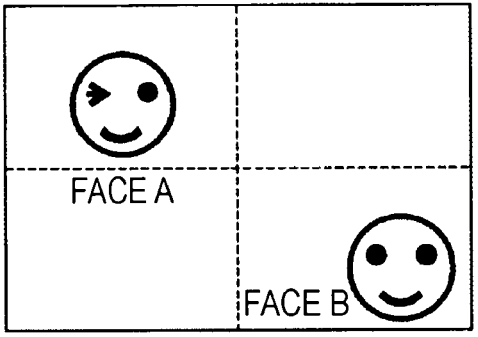

It is assumed that the state shown in FIG. 13A is changed to a state shown in FIG. 13B after a certain period of time. In FIG. 13B, one of the operator's eyes (right eye in this embodiment) of the face image A is closed, which is a facial gesture corresponding to the preferential motion. However, both the eyes of the face image B remain open. This state of the face image B is the same as that in FIG. 13A.

In this case, the priority level assigned to the face image A is higher than that assigned to the face image B as described with reference to FIGS. 11A and 11B. In FIG. 13B, a priority level of 70 is assigned to the face image A by adding a priority level of 50 to the priority level of 20 of the face image A of FIG. 13A, and the priority level of the face image B is not changed from that of FIG. 13A, that is, the face image B has the priority level of 0.

Figure 13C:
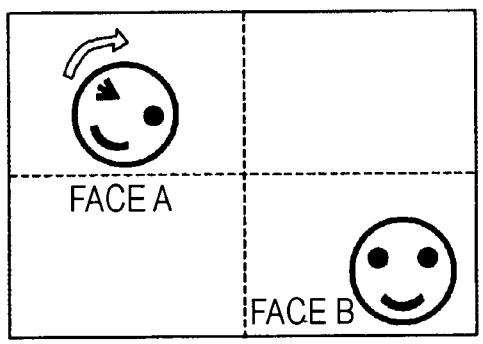

Next, in FIG. 13C, both the eyes of the face image B remain open, which are not changed from those of FIG. 13A. On the other hand, the face image A is inclined leftward in FIG. 13C while one of the eyes remains closed.

This change of the face image A corresponds to the case where a specific facial gesture pattern corresponding to the preferential operation as shown in FIG. 12 is performed. In this case, a priority level of 50 is added to the priority level of the face image A of FIG. 13B so that a priority level of 120 is assigned to the face image A. The priority level of the face image B is still 0.

The digital still camera 1 determines a face image to be a gesture recognition object in accordance with set priority levels. The face image to be a gesture recognition object is a face image set as an object in which a facial gesture pattern thereof corresponding to a certain operation is to be recognized by the digital still camera 1.

If a face image having a priority level of 100 or more is not included in a plurality of face images, for example, it is determined that all the plurality of face images correspond to gesture recognition objects.

On the other hand, if one of the plurality of face images has a priority level of 100 or more, only the face image having the priority level of 100 or more is set as a gesture recognition object, and other face images are not gesture recognition objects. That is, the gesture recognition object is fixed to only one face image having the priority level of 100 or more. The gesture recognition object is fixed until the priority level thereof becomes smaller than 100.

Note that even in a period in which the gesture recognition object is fixed as described above (recognition-object fixed period), the priority-level setting is performed on all the faces detected in the image frame in accordance with the operations shown in FIGS. 8 to 12. Therefore, in the recognition-object fixed period, a face image other than the face image which has been determined to be the gesture-recognition object may have a priority level of 100 or more. However, in the gesture-recognition-object setting period, only the face image first set as the gesture-recognition object is fixedly determined as the gesture-recognition object, and other face images are not determined as gesture-recognition objects irrespective of whether priority levels of the other face images reached 100.

Here, setting of the gesture-recognition object performed in FIGS. 13A to 13C will be confirmed.

In FIG. 13A, the priority level of 20 is assigned to the face image A, and the priority level of 0 is assigned to the face image B, which are smaller than 100. That is, a face image having a priority level of 100 or more is not included. In this case, all the face images are set as gesture recognition objects. As with the case of FIG. 13A, in FIG. 13B, all the face images are set as gesture recognition objects.

In FIG. 13C, the face image A has the priority level of 120 whereas the face image B has the priority level of 0. Accordingly, in this case, only the face image A is set as the gesture recognition object whereas the face image B is not set as a gesture recognition object.

Figure 13D:
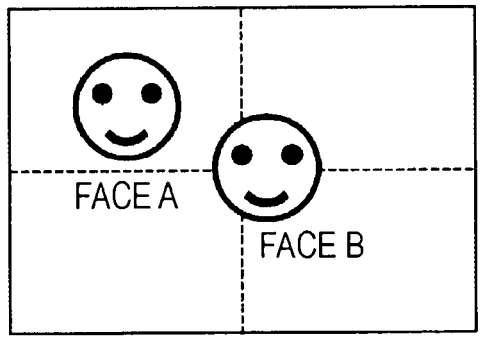

In FIG. 13D which is obtained a certain period of time after the state of FIG. 13C, the priority level of the face image A is reduced from 120 to 100. This is because a negative priority level of −20 obtained in accordance with a relative difference between a distance between the face image A to the center of the image frame and a distance between the face image B to the center of the image frame is added to the priority level of the face image A. However, since the face image A still have the priority level equal to or larger than 100, the face image A keeps the setting as the gesture recognition object set in the timing of FIG. 13C, that is, the setting is effective.

Furthermore, in FIG. 13D, since the face image B moved close to the center of the image frame 300, a priority level of 20 is added to the priority level 0 of the face image B, and accordingly, the face image B has the priority level of 20. However, since the face image A is still set as the gesture recognition object, the face image B maintains the state in which the face image B is not set as the gesture recognition object.

Figure 14A:
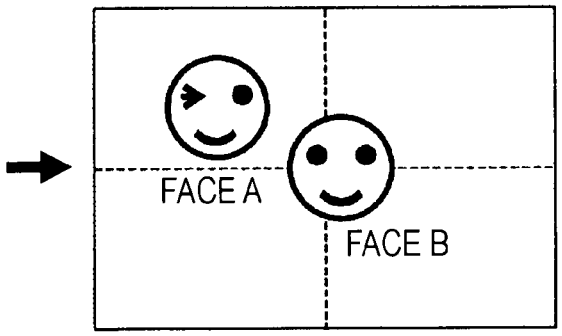
FIGS. 14A to 14C are diagrams illustrating concrete examples of the priority level setting in accordance with the priority-level setting conditions of FIGS. 8 to 12 in a time-series manner.

FIG. 14A shows a state of the image frame 300 a certain period of time after the state of FIG. 13D.

FIG. 14A shows a facial gesture of the face image A in which a state in which both the eyes are open is changed to a state in which one of the eyes is closed. The digital still camera 1 recognizes this operation for closing one of the eyes, that is, an eye-closing command. Therefore, the priority level of the face image A is increased from 100 to 150 since a priority level of 50 is added, and the fixed setting as the gesture recognition object is maintained. In this case, the priority level of 20 of the face image B is not changed, and the face image B maintains the state in which the face image B is not set as a gesture recognition object.

Figure 14B:
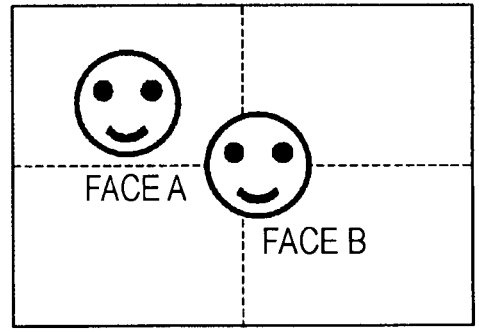

The image frame 300 shown FIG. 14B obtained certain period of time after the state of FIG. 14A shows a state after an operation for opening both the eyes is performed which is changed from the state in which one of the eyes of the face image A is closed. By this, the digital still camera 1 recognizes this operation as an eye-opening command.

Here, the priority levels of the face images A and B are not changed, that is, the same as those of FIG. 14A, and similarly to the case of FIG. 14A, the face image A is set as a gesture recognition object whereas the face image B is not set as a gesture recognition object.

Then, in an operation flow shown in FIGS. 14A and 14B, the state in which both the eyes of the face image A are open is changed to a state in which one of the eyes of the face image A is closed, and to a state in which both the eyes of the face image A are open again. This series of states represents a facial gesture pattern corresponding to an operation for instructing image capturing using the self-timer. When recognizing this facial gesture pattern, the digital still camera 1 executes the operation for the image capturing using the self-timer.

Figure 14C:
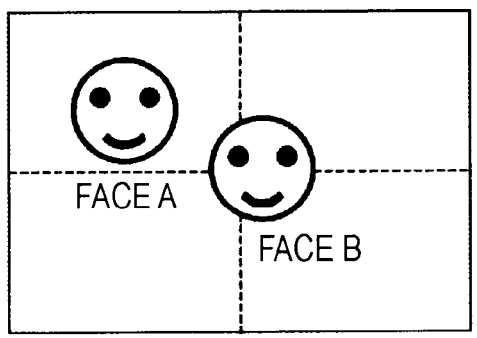

A state shown in FIG. 14C is obtained when the operation for the image capturing using the self-timer is terminated. When the image capturing using the self-timer is terminated, first, the priority level of the face image A is reset to 0. That is, when an operation performed in response to an operation in accordance with a facial gesture pattern is terminated, a priority level of a face image which is subjected to the operation corresponding to the facial gesture pattern is reset to 0. Conditions such as positions of the face images in the image frame are the same as those of FIG. 14B, and therefore, the priority level 20 which is the same as that assigned in FIG. 14B is assigned to the face image B. In this way, both the face images A and B are determined as gesture recognition objects in FIG. 14C.

5. Example of Implementation

Next, an example of technical configuration which realizes remote control (facial-gesture remote control) in accordance with the facial gesture as described above will be described.

Figure 15:
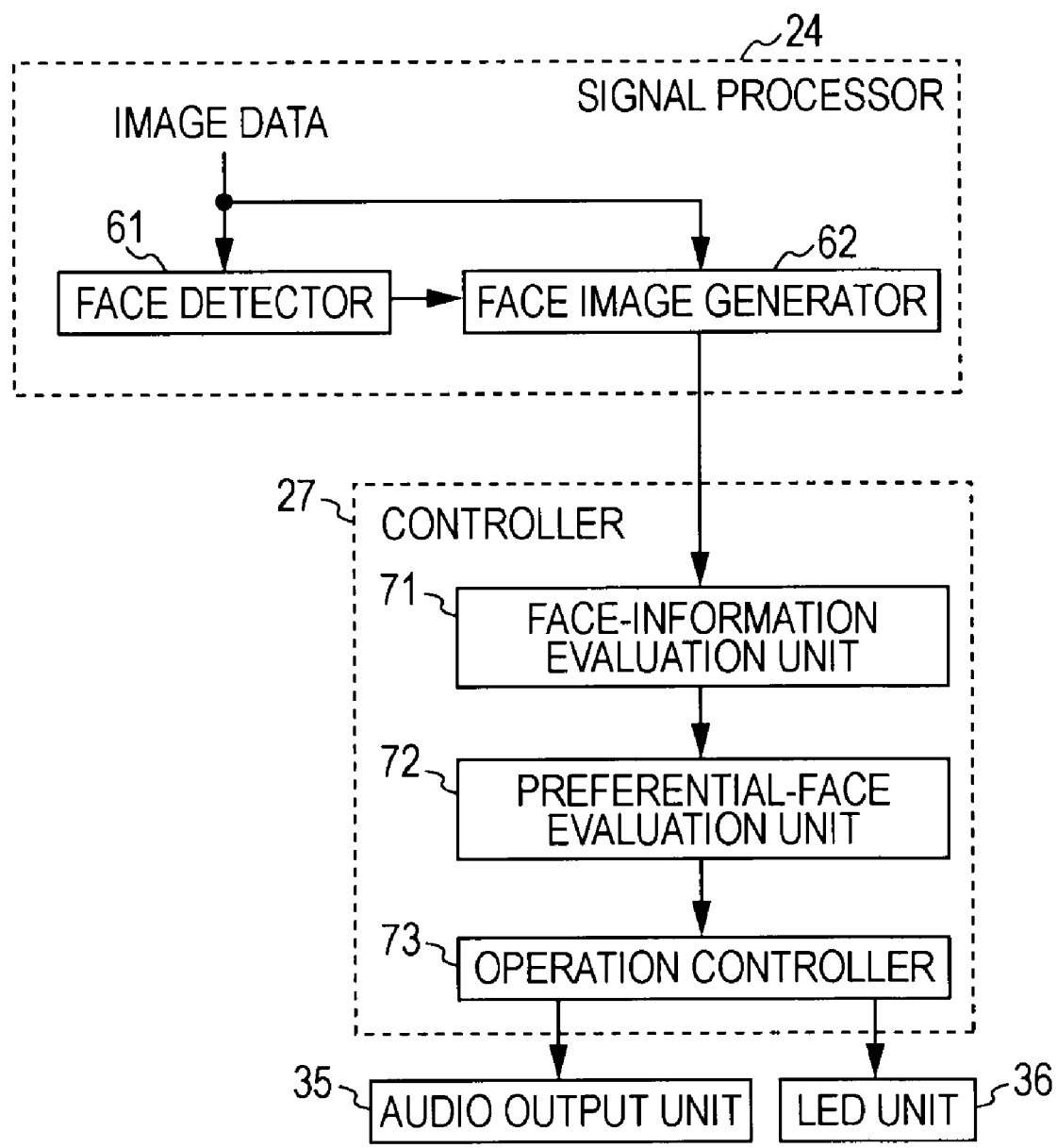
FIG. 15 is a diagram illustrating an example of a configuration of a system of a digital still camera complying with a facial-gesture remote control function according to the embodiment.

FIG. 15 is a diagram illustrating an example of a configuration of a system of the digital still camera 1 complying with a facial-gesture remote control function according to the embodiment.

The system configuration shown in FIG. 15 includes the signal processor 24 including a face detector 61 and a face-image generator 62, the controller 27 including a face-information evaluation unit 71, a preferential-face evaluation unit 72, and a remote-control operation controller 73, the audio output unit 35, and the LED unit 36.

Figure 16:
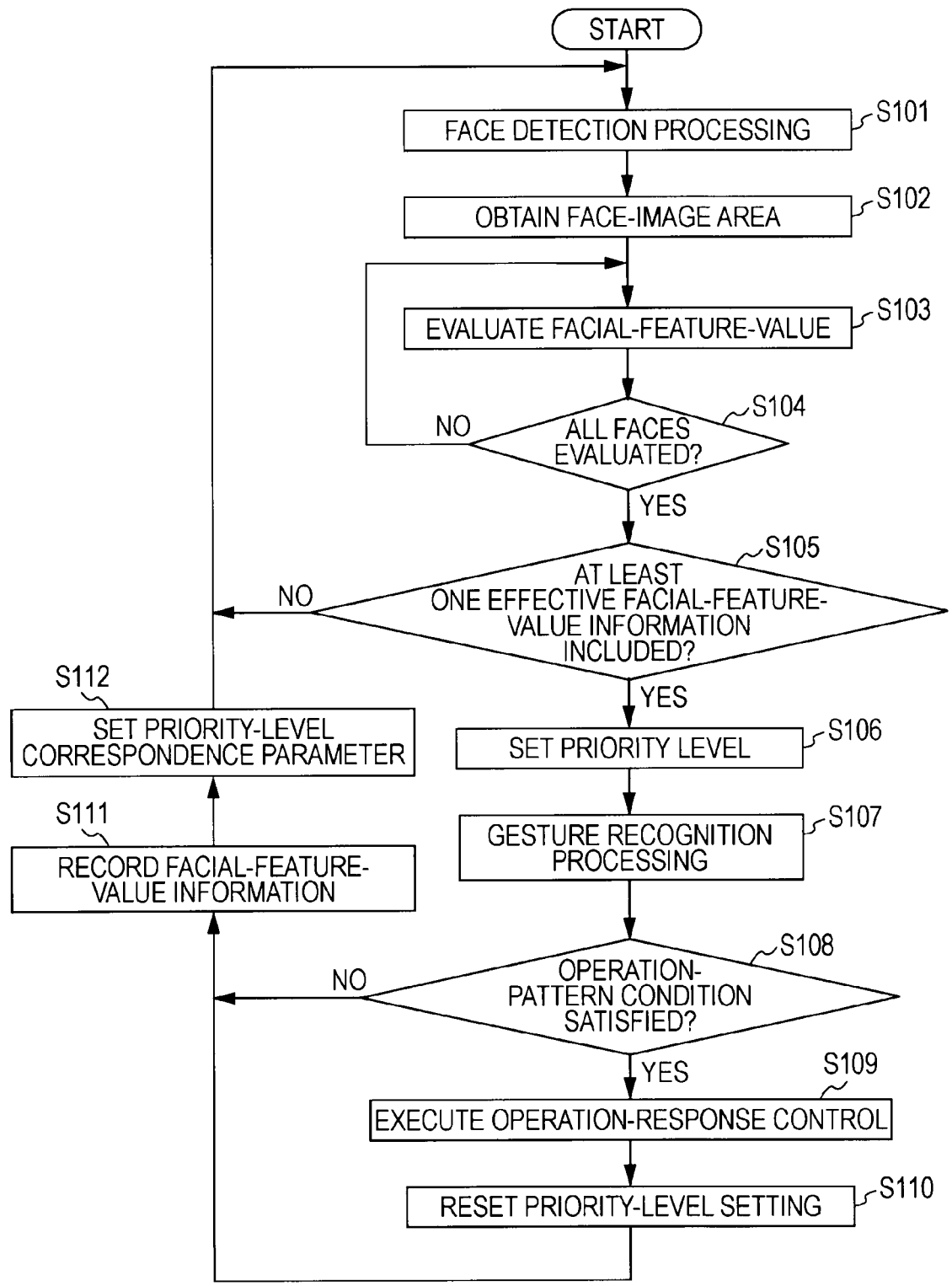
FIG. 16 is a flowchart illustrating an example of a processing procedure of the face-expression remote control function executed by the system shown in FIG. 15.

FIG. 16 is a flowchart illustrating a basic processing procedure executed by the system shown in FIG. 15. Functions of the units shown in FIG. 15 will be described with reference to the flowchart shown in FIG. 16.

In step S101 of FIG. 16, the face detector 61 of the signal processor 24 receives image data captured by an image capturing section (including the optical system unit 21 and the image sensor 22) and transmitted through the A/D convertor 23 and performs face-image detection processing on the image data. Specifically, image portions (face image portions) recognized as faces are detected in an image frame corresponding to the image data.

As a result of the face-image detection processing, information on positions (the centers of gravities) of the detected face image portions in the image frame and information on sizes of the detected face image portions are obtained. The face detector 61 supplies the information as face detection information to the face-image generator 62.

Note that a number of face detection systems or a number of face detection methods applicable to the face detector 61 have been known. However, a method employed in this embodiment is not particularly limited, and any method may be employed taking detection accuracy and a difficulty level of design into consideration.

The face-image generator 62 receives the image data and the face detection information supplied from the face detector 61. In step S102, the face-image generator 62 performs processing for extracting regions corresponding to the face image portions from a frame image region of the image data using the information on the positions of the face image portions and the information on the sizes of the face image portions represented by the face detection information. Note that the regions extracted from the frame image region are referred to as "face image areas".

The face-image generator 62 supplies the face image area of the image data and the corresponding face detection information to the face-information evaluation unit 71 of the controller 27.

The face detection processing performed by the signal processor 24 is realized by image signal processing using a DSP (Digital Signal Processor), that is, realized by a program and an instruction supplied to the DSP. Accordingly, the face detector 61 and the face-image generator 62 included in the signal processor 24 are also realized by the DSP.

In step S103, the face-information evaluation unit 71 performs processing for evaluating (estimating) feature values of a face image included in the face image area using data of the received data of the face image area. Note that, when a plurality of face images are detected, the evaluation processing in step S103 is performed on one of the plurality of face images.

Examples of the face feature values to be evaluated and estimated include a state of opening or closing of eyes, a state of opening or closing of a mouth, an age, a gender, a face direction, a face inclination, and a subject distance.

As for an evaluation of the state of opening or closing of eyes, it is determined whether the eyes are open or closed.

As for an evaluation of the state of opening or closing of a mouth, it is determined whether the mouth is open or closed.

As for the age, an age is estimated from predetermined age ranges. In this embodiment, for example, as a minimum requirement, an age is estimated using two age ranges including an adult range and a child range.

As for the gender, it is determined whether a person is a man or a woman.

As for the face direction, a direction in which the face faces is determined while a direction facing the digital still camera 1 is determined as the front. In this embodiment, as a minimum requirement, a determination as to whether a face faces substantially the front is made.

As for the face inclination, for example, the face inclination described with reference to FIG. 4 is determined. For example, it is determined whether a face image is in an erecting state which is not inclined, a state of leftward inclination, or a state of rightward inclination.

As for the subject distance which is a distance between the digital still camera 1 to a subject as shown in FIG. 8, in this embodiment, the subject distance can be estimated using the size of the face image area included in the image frame as described with reference to FIG. 8. In order to obtain the subject distance with high accuracy, the size of the face image area is modified and normalized in accordance with an estimated age. Thereafter, the subject distance is obtained using the size. Note that information obtained as results of the evaluation processing is referred to as "face-feature-value information".

Note that the subject distance may be obtained using a method and a configuration of distance measurement used for focus control of an imaging apparatus. Examples of such a method for distance measurement include an active method using trigonometric range finding employing a floodlight and a passive method.

After the processing for evaluating a face feature value for one face image is executed in step S103, the face-information evaluation unit 71 determines whether all the detected face images have been evaluated in step S104. When the determination is negative in step S104, the process returns to step S103, and the processing for evaluating a face feature value is performed on the next face image area. On the other hand, when the determination is affirmative in step S104 since all the face image areas have been subjected to the evaluation processing, face-feature-value information for each face image area obtained through the evaluation processing is supplied to the preferential-face evaluation unit 72. That is, the process proceeds from step S104 to step S105.

In step S105, the preferential-face evaluation unit 72 determines whether at least one effective face-feature-value information is obtained in accordance with the face-feature-value information received from the face-information evaluation unit 71. For example, in practical use, even if a face image is detected by the face detection processing, an image corresponding to data of the extracted face image area is not clear and therefore, effective face-feature-value information may not be obtained. When effective face-feature-value information is not obtained, a facial gesture is not appropriately recognized in subsequent processing.

When the determination is negative in step S105, the process returns to step S101 where the face detector 61 performs the face detection processing. On the other hand, when the determination is affirmative in step S105, the process proceeds to step S106.

In step S106, the preferential-face evaluation unit 72 executes processing for setting priority levels (priority order) to face images corresponding to the effective face-feature-value information.

Examples of procedures of the processing for setting priority levels will be described with reference to FIGS. 17 to 23. The priority levels are set using at least one of the setting conditions described with reference to FIGS. 8 to 12.

In step S107, the remote-control operation controller 73 selects a face image area to be a gesture recognition object in accordance with set priority levels. Then, processing for recognizing a motion corresponding to a facial gesture is performed on the face image area selected as the gesture recognition object. In this recognition processing, eye-closing-state determination and an eye-opening-state determination using the methods described with reference to FIGS. 6 and 7 are performed.

In step S108, the remote-control operation controller 73 determines whether a motion (facial gesture) in the face image area satisfies a pattern condition corresponding to a certain operation. That is, the remote-control operation controller 73 determines whether a facial gesture pattern corresponding to a certain operation is obtained as a result of the gesture recognition processing in step S107.

When the determination is negative in step S108, the process proceeds to step S111 where processing for storing the effective face-feature-value information obtained in step S103 is performed. The feature-value information may be recorded (written) in the RAM 29, for example.

When the priority levels are set in step S106 in accordance with the speed of a motion of the face image shown in FIG. 10 or the facial gesture conditions shown in FIGS. 11 and 12, a change of the face image area in a time axis should be detected. For this detection, not only information on the face image area currently detected but also information on a preceding face image area in terms of time are used. The operation of step S111 is performed so that information on a preceding face image area in terms of time is stored.

After the operation of step S111, the preferential-face evaluation unit 72 performs processing for changing setting of predetermined parameters relating to the processing shown in FIG. 16 in accordance with the priority levels set in step S106 for individual face images in step S112.

The parameters to be changed and methods for changing the parameters in step S112 will be described hereinafter. By performing an operation in step S112, the processing shown in FIG. 16 is optimized in accordance with the priority levels currently set. By this, low possibility of misrecognition of the operator, for example, is attained, and reliability of the facial gesture remote control is improved.

When the determination is affirmative in step S108, the process proceeds to step S109.

In step S109, the remote-control operation controller 73 controls the digital still camera 1 so that an appropriate operation is performed in response to the operation using the facial gesture pattern recognized in step S108.

Then, after the processing performed in response to the operation is terminated, the process proceeds to step S110 where the priority level which has been set in the face image area serving as the gesture recognition object is reset to 0.

Thereafter, other routines are performed where appropriate, and the processing starting from step S101 is performed again.

Figure 17:
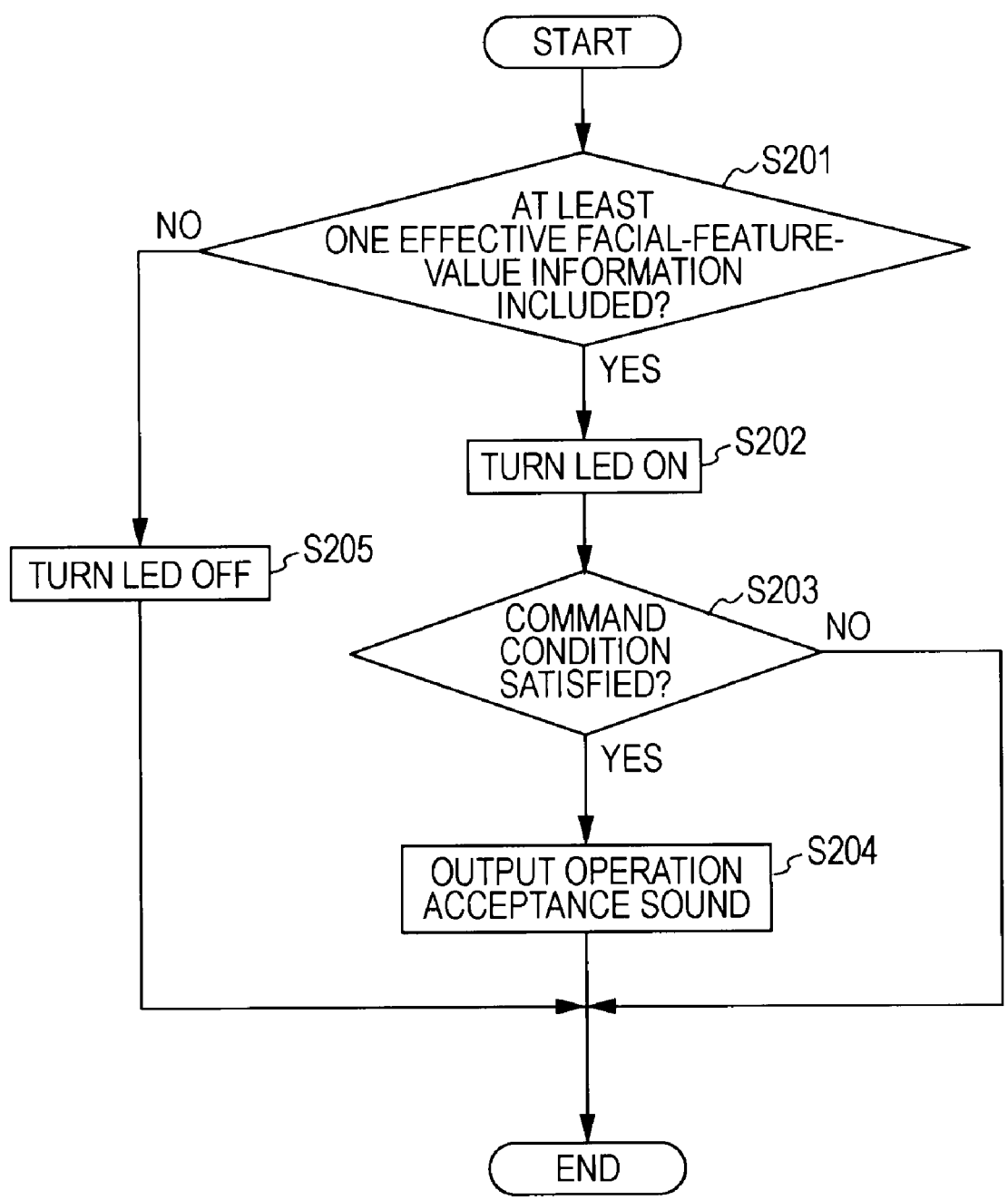
FIG. 17 is a flowchart illustrating an example of a processing procedure of notification control for facial expressions executed by the system shown in FIG. 15.

FIG. 17 shows a flowchart illustrating processing for performing notification by sound or by turning a LED on which is repeatedly performed by the preferential-face evaluation unit 72 and the remote-control operation controller 73 in parallel to the processing of FIG. 16.

In step S201, the preferential-face evaluation unit 72 determines whether at least one effective face-feature-value information item has been obtained in accordance with the content of the face-feature-value information items supplied from the face-information evaluation unit 71 in step S201. The operation in step S201 is the same as the operation in step S105, and therefore, a result of the operation in step S105 can be used in step S201.

When the determination is negative in step S201, the process proceeds to step S205 where the LED of the LED unit 36 is controlled to be turned off. Then, the processing of FIG. 17 is terminated, and the process returns to step S201 at an appropriate timing.

On the other hand, when the determination is affirmative in step S201, the LED of the LED unit 36 is turned on in step S202, and then, the process proceeds to step S203. By this, an operation for turning on the LED corresponding to the operation at the time point t1 of FIG. 5 is realized.

In step S203, the remote-control operation controller 73 determines whether a motion (facial gesture) of the face image area satisfies a requirement for a command corresponding to a facial gesture (for example, the eye-closing command or the eye-opening command shown in FIG. 5).

When the determination is negative in step S203, the processing of FIG. 17 is terminated and the process returns to step S201 at an appropriate timing.

On the other hand, when the determination is affirmative in step S203, the process proceeds to step S204 where an operation accepting sound is output. In this way, the notification sound is output at the time point t3 and at the time point t4 as shown in FIG. 5.

Next, the priority-level setting processing performed in step S106 of the flowchart of FIG. 16 will be described in detail.

Figure 18:
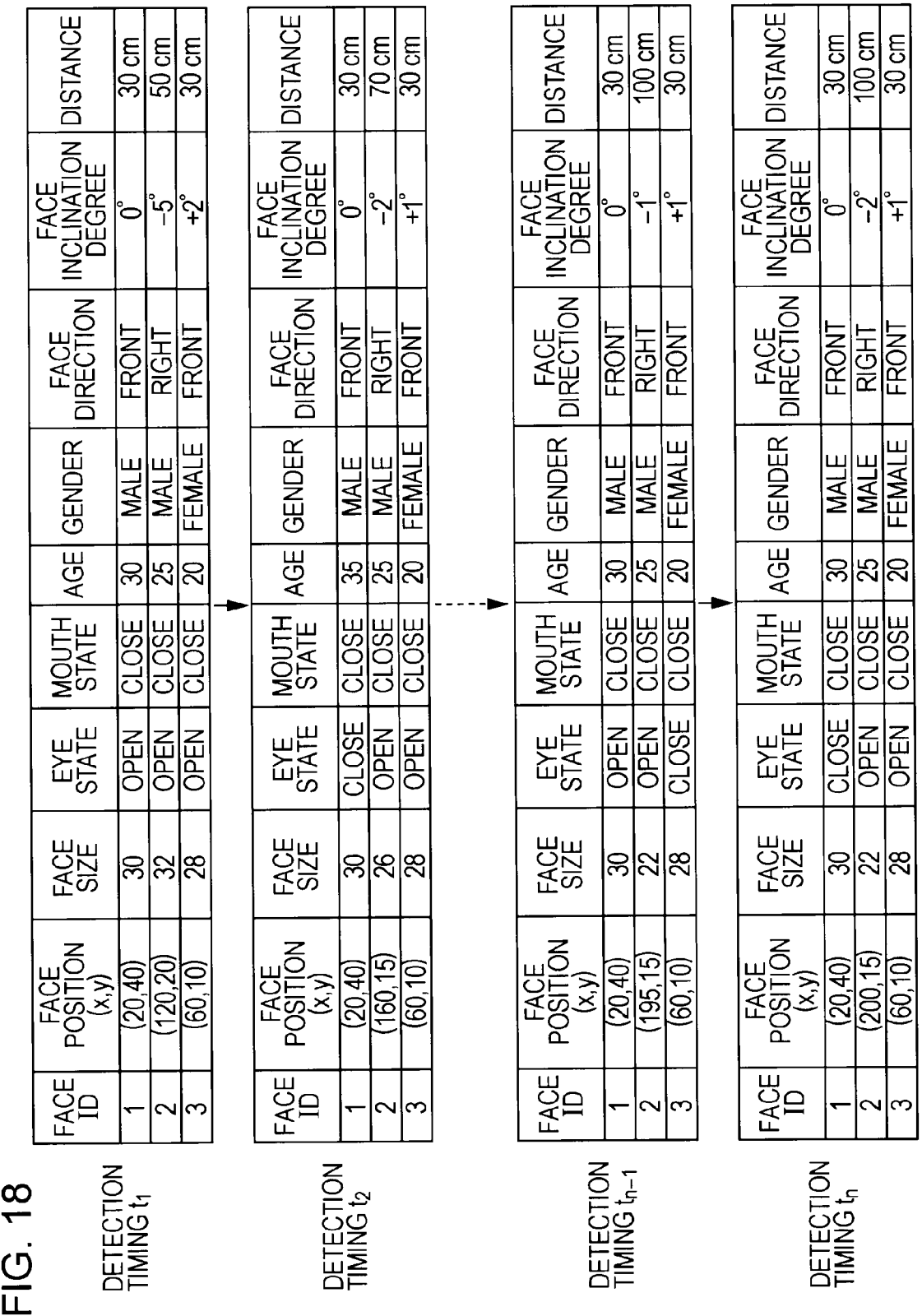
FIG. 18 show tables illustrating examples of recorded-facial-feature information.

Before the description, examples of the face-feature-value information recorded in step S111 of FIG. 16 will be shown in FIG. 18. Note that the face-feature-value information recorded in step Sill of FIG. 16 is referred to as "recording face-feature-value information" so as to be distinguished from the face-feature-value information (current face-feature-value information) at a current time (current detection timing) obtained in step S103.

FIG. 18 shows recording face-feature-value information items recorded in step S111 at the detection timings t1 to tn. One of the detection timings corresponds to a timing in which one sequence from step S101 to step S112 of FIG. 16 is performed, that is, corresponds to one detection timing Dt shown in FIGS. 6 and 7.

The recording face-feature-value information for each detection timing includes information items such as "face ID", "face position", "face size", "eye state", "mouth state", "age", "gender", "face direction", "face inclination degree", and "subject distance (distance)".

"Face ID" is an identifier uniquely assigned to a face image area in which effective face-feature-value information is detected. Here, numbers starting from 1 are assigned in ascending order. Note that "face position", "face size", "eye state", "mouth state", "age", "gender", "face direction", "face inclination degree", and "subject distance" are associated with a face image to which "face ID" is assigned.

"Face position" represents a position of a corresponding face image area detected in the image frame. For example, "face position" is represented by x and y coordinates set to the face frame.

"Face size" represents a size of the corresponding face image area in the image frame.

"Eye state" is information representing whether a state of eyes detected in the corresponding face image area is an open state or a close state. Note that, when it is determined that at least one of the eyes is in a close state, the eye state is determined to be a close state.

"Mouth state" is information representing whether a state of a mouth detected in the corresponding face image area is an open state or a close state.

"Age" represents an age determined in the corresponding face image area. Here, "age" is represented by a numeric value corresponding to an age.

"Gender" represents a gender, i.e., man or woman, determined in the corresponding face image area.

"Face direction" represents a face direction detected in the corresponding face image area, and here, represents whether a face faces the front, the right, or the left.

"Face inclination degree" represents an inclination of a case and is denoted by degree. When a value representing an inclination degree is 0, the face faces the front. As an absolute value of a negative value or a positive value representing an inclination degree becomes larger, a degree of inclination leftward or rightward becomes large.

"Subject Distance" is represented by a unit of cm in this embodiment.

In step S111, information on the configuration shown in FIG. 18, for example, is recorded as the effective face-feature-value information currently obtained in step S103. Note that, as a method for recording in step S111, for example, recording face-feature-value information recorded in step S111 at a preceding detection timing is removed by rewriting current face-feature-value information. Alternatively, a predetermined number of face-feature-value information items obtained before the current detection timing may be stored and the oldest face-feature-value information item may be replaced by the current face-feature-value information.

In this way, by storing preceding face-feature-value information as recording face-feature-value information, face-feature-value information obtained at a current detection timing can be compared with the preceding face-feature-value information. By this, a change of a motion of a face can be recognized.

Figure 19:
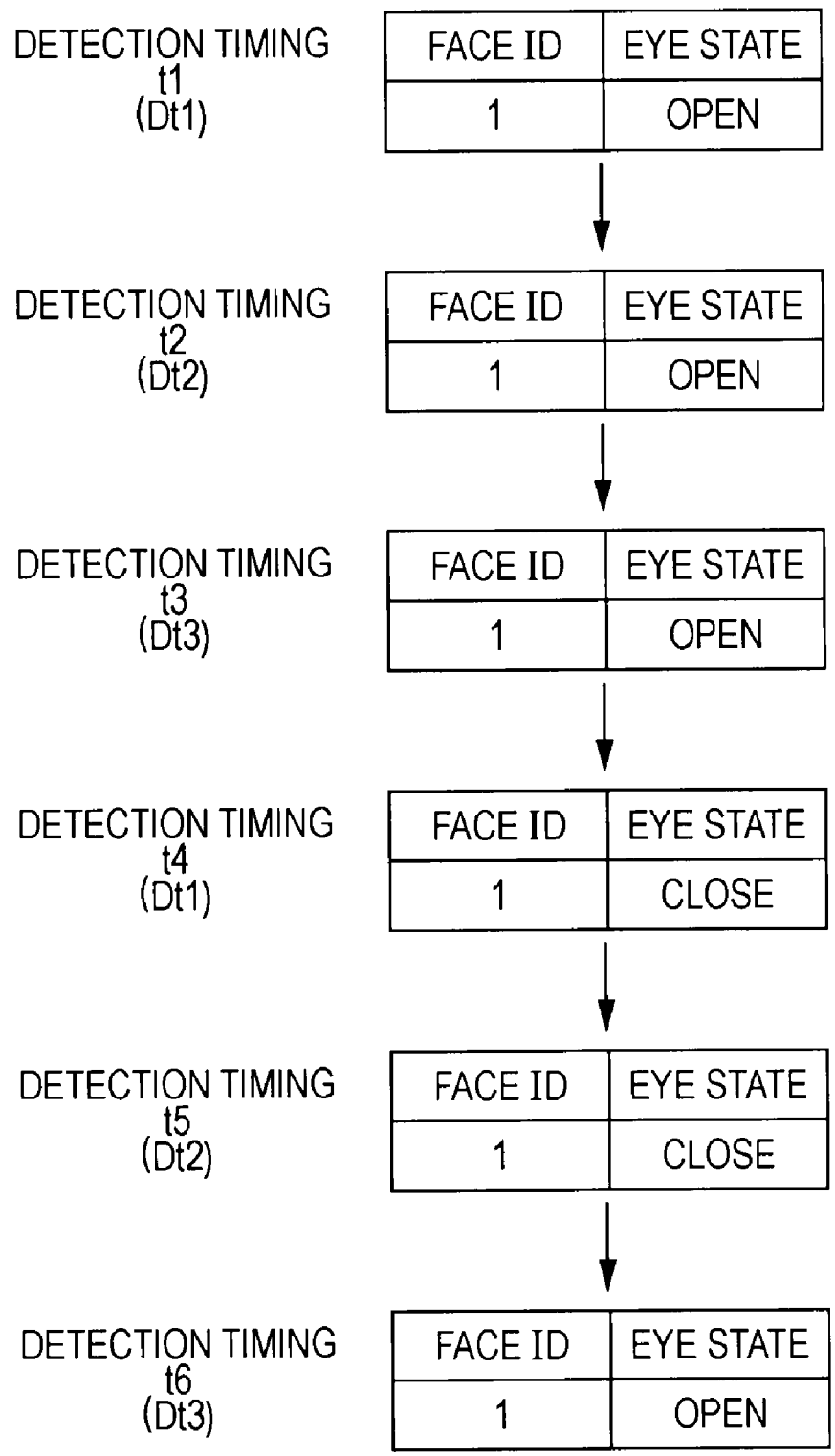
FIG. 19 is a diagram illustrating an example of change of the recorded-facial-feature information with time.

For example, FIG. 19 shows items of "eye state" of the face-feature-value information corresponding to "face ID" of 1 which are extracted at the detection timings t1 to t6. Note that the detection timings t1 to t6 correspond to the detection timings Dt1, Dt2, Dt3, Dt1, Dt2, and Dt3, respectively.

By recognizing results of the detection of "eye state" in a time-series manner, in this case, for example, it is determined that the eye-opening state is detected at the detection timings t1 to t3. At the detection timings t4 and t5, the eye-closing state is detected, and at the detection timing t6, the eye-opening state is detected. Here, the detection timings t4 to t6 correspond to the detection timings Dt1 to Dt3. Therefore, in accordance with the description with reference to FIG. 6, the eye-closing state is detected in a period of time corresponding to the detection timings t4 to t6.

Figure 20:
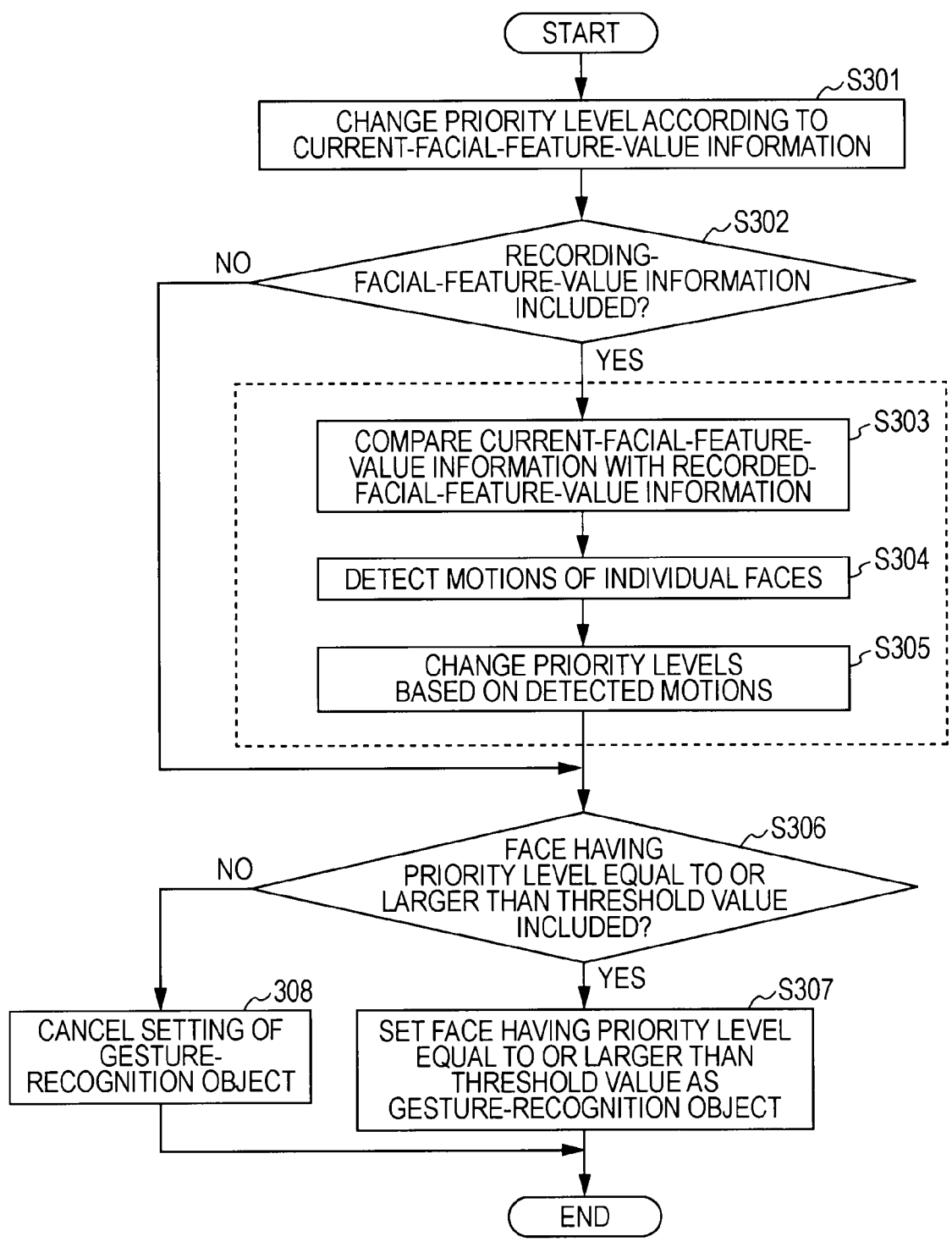
FIG. 20 is a flowchart illustrating priority-level setting processing.

FIG. 20 is a flowchart illustrating the priority-level setting processing performed by the preferential-face evaluation unit 72 in step S106 of FIG. 16.

In step S301, in accordance with the effective face-feature-value information (current face-feature-value information) currently obtained in step S103, the preferential-face evaluation unit 72 sets additional values to be added to priority levels for each face image from which the current face-feature-value information is obtained in accordance with a predetermined priority-level setting condition according to a predetermined rule using the effective face-feature-value information. Then, the obtained additional values are added to priority levels which have been set to the face images whereby change of the priority levels is performed.

The priority-level setting condition which can be used when the additional values are set in step S301 is the subject distance based on a size of a face image area shown in FIG. 8 or a distance difference between face images relative to the center of an image frame shown in FIG. 9 among the conditions described in FIGS. 8 to 12.

In step S301, the additional values can be obtained using the subject distance or the distance difference relative to the center of the image frame, for example. Alternatively, additional values may be obtained for individual priority-level setting conditions and the obtained additional values may be added to the priority levels which have been set.

In step S302, it is determined whether the recording face-feature-value information is currently stored.

When the determination is negative in step S302, step S303 to step S305 are skipped, and the process proceeds to step S306. On the other hand, when the determination is affirmative in step S302, operations of step S303 to step S305 are performed, and thereafter, the process proceeds to step S306.

The operations of step S303 to step S305 described below are performed in order to evaluate priority levels in accordance with the priority-level setting condition in which a time-series change of a face image area should be detected and recognized, such as the condition relating to the speed of a motion of a face shown in FIG. 10 or the condition relating to the facial gesture shown in FIGS. 11 and 12.

Furthermore, the operation of step S303 to step S305 described below are broader concepts which are common in the priority-level setting conditions shown in FIGS. 10, 11, and 12. Priority-level evaluation processing for each of the priority-level setting conditions shown in FIGS. 10, 11, and 12 will be described in detail with reference to FIGS. 21 to 23.

In step S303, predetermined information items of the current face-feature-value information are compared with those of the recording face-feature-value information, and results of the comparison are stored. Note that types and the number of information items to be compared are different depending on a priority-level setting condition used for priority-level evaluation.

In step S304, in accordance with the comparison result obtained in step S303, motions of faces corresponding to face images in face image areas are detected.

Note that types of the motions for detecting changes in step S304 are also different depending on a priority-level setting condition used for priority-level evaluation.

In step S305, additional values are obtained for individual face images in accordance with results of motions detected in step S304, and the additional values are added to the priority levels which have been set so that the priority levels are updated.

In step 306, it is determined whether a face image having a priority level higher than the threshold value described in FIGS. 13 and 14 are included. When the determination is affirmative in step S306, the face image having the priority level higher than the threshold value is set as a gesture recognition object as described with reference to FIGS. 13 and 14.

When the gesture recognition object is set as described above, the determination in step S108 is performed only in accordance with a motion of a face corresponding to a face image area serving as the gesture recognition object.

On the other hand, when the determination is negative in step S306, an operation in step S308 is performed and the processing shown in FIG. 20 is terminated.

In step S308, if a face image which has been set as a gesture recognition object is included, the setting of the gesture recognition object is cancelled.

Figure 21:
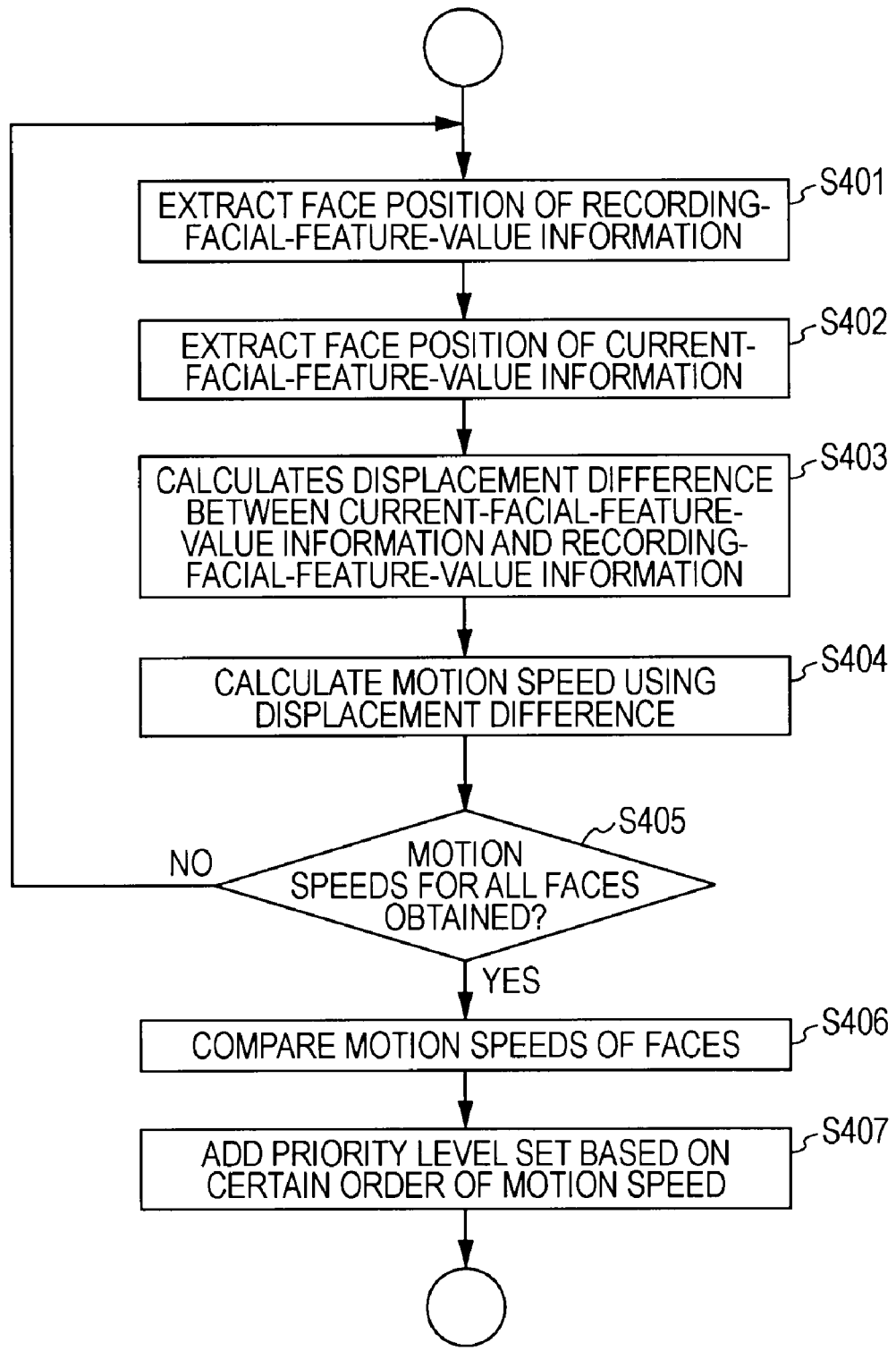
FIG. 21 is a flowchart illustrating the priority-level setting processing in the case where the motion speed is set as the priority-level setting condition.

FIG. 21 is a flowchart illustrating the operations in step S303 to step S305 shown in FIG. 20, that is, the priority-level evaluation processing in accordance with a change of a time-series motion in a face image area on the basis of the priority-level setting condition of a motion speed described with reference to FIG. 10.

In step S401, information on a face position (recording face-position information) is extracted from recording face-feature-value information selected in accordance with a predetermined order. That is, information on a previous face position in a face image is obtained.

In step S402, information on a face position (current face-position information) is extracted from the effective face-feature-value information currently obtained in step S103. That is, information on a current face position which is the latest face position is obtained.

In step S403, a displacement difference between the position represented by the recording face-position information and the position represented by the current face-position information is calculated, and in step S404, a motion speed of a face is obtained in accordance with the displacement difference.

In step S405, it is determined whether motion speeds of all faces are obtained. When the determination is negative in step S405, the process returns to step S401 so that a motion speed of the next face is obtained.

On the other hand, when the determination is affirmative in step S405, the process proceeds to step S406.

In step S406, the motion speeds of the faces obtained through the foregoing processing are compared with one another so that an order of the face images corresponding to the faces is set in accordance with the motion speeds. Then, in step S407, in accordance with a predetermined rule, for example, additional values are set for the face images so that the additional values become large as the motion speeds are reduced, and the set additional values are added to the priority levels so that the priority levels are updated.

Figure 22:
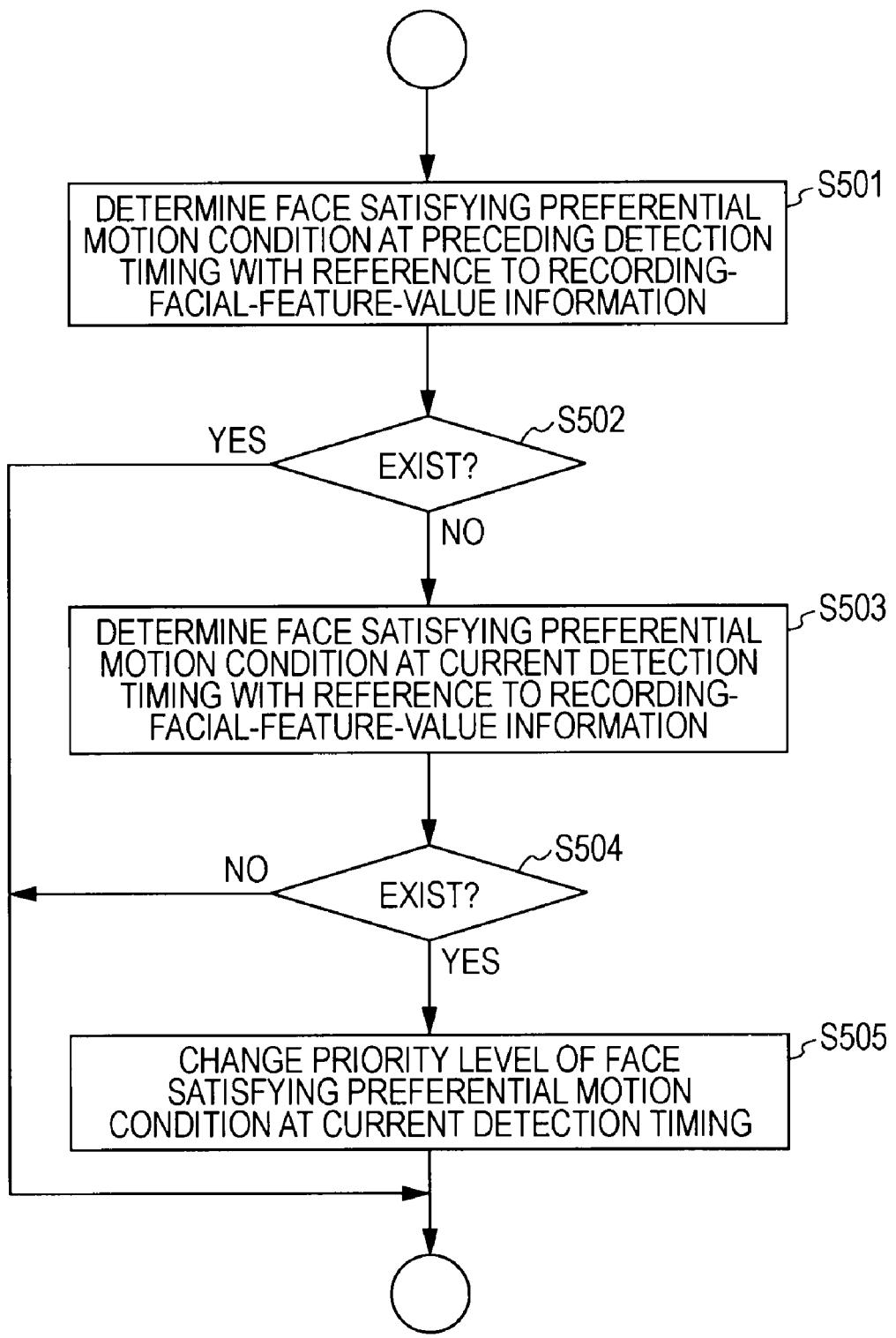
FIG. 22 is a flowchart illustrating the priority-level setting processing in the case where the facial-expression command is set as the priority-level setting condition.

FIG. 22 is a flowchart illustrating the operations in step S303 to step S305 shown in FIG. 20, that is, the priority-level evaluation processing when a motion of a face corresponding to one of motion elements (for example, the eye-closing command and the eye-opening command recognized in FIGS. 6 and 7) which may be included in a facial gesture pattern, which is described with reference to FIG. 11, is set as a priority-level setting condition.

In step S501, in accordance with the recording face-feature-value information, a face image which first satisfies a preferential motion condition (a face image corresponding to a face which performs a motion determined as a preferential motion) at a detection timing immediately before the current detection timing is to be detected. For the detection, for example, a predetermined number of recording face-feature-value information items obtained before the immediately previous detection timing inclusive should be stored, and changes of necessary information items included in the recording face-feature-value information items are checked as shown in FIG. 19. For example, if the preferential motion condition shown in FIG. 11 is employed, a determination as to whether a motion corresponding to the eye-closing command and the eye-opening command in this order is obtained is made by checking a time-series motion of "eye state" included in the recording face-feature-value information. Such a determination is performed on all the face images.

In step S502, in accordance with a result of the determination in step S501, it is determined whether a face which completed a motion which satisfies the preferential motion condition is included. When the determination is affirmative in step S502, addition of the priority levels in accordance with the fact that the preferential motion condition has been satisfied has been performed in step S505 at a preceding detection timing, which will be described hereinafter. Therefore, the processing of FIG. 22 is terminated, and the process proceeds to step S306 of FIG. 20.

On the other hand, when the determination is negative in step S502, the process proceeds to step S503.

In step S503, it is determined whether a face in which a motion thereof which first satisfies the preferential motion condition at a detection timing of this time (current detection timing) is included in accordance with the recording face-feature-value information and the current face-feature-value information.

When the determination is negative in step S504, the processing of FIG. 22 is terminated and the process proceeds to step S306 of FIG. 20. Accordingly, a face image to which a priority level is added (changed) does not exist at the current detection timing.

On the other hand, when the determination is affirmative in step S504, the process proceeds to step S505.

In step S505, a predetermined additional value is added to a priority level of a face image corresponding to a face which is determined to first satisfy the preferential motion condition at the current detection timing so that a high priority level is assigned to the face image.

Figure 23:
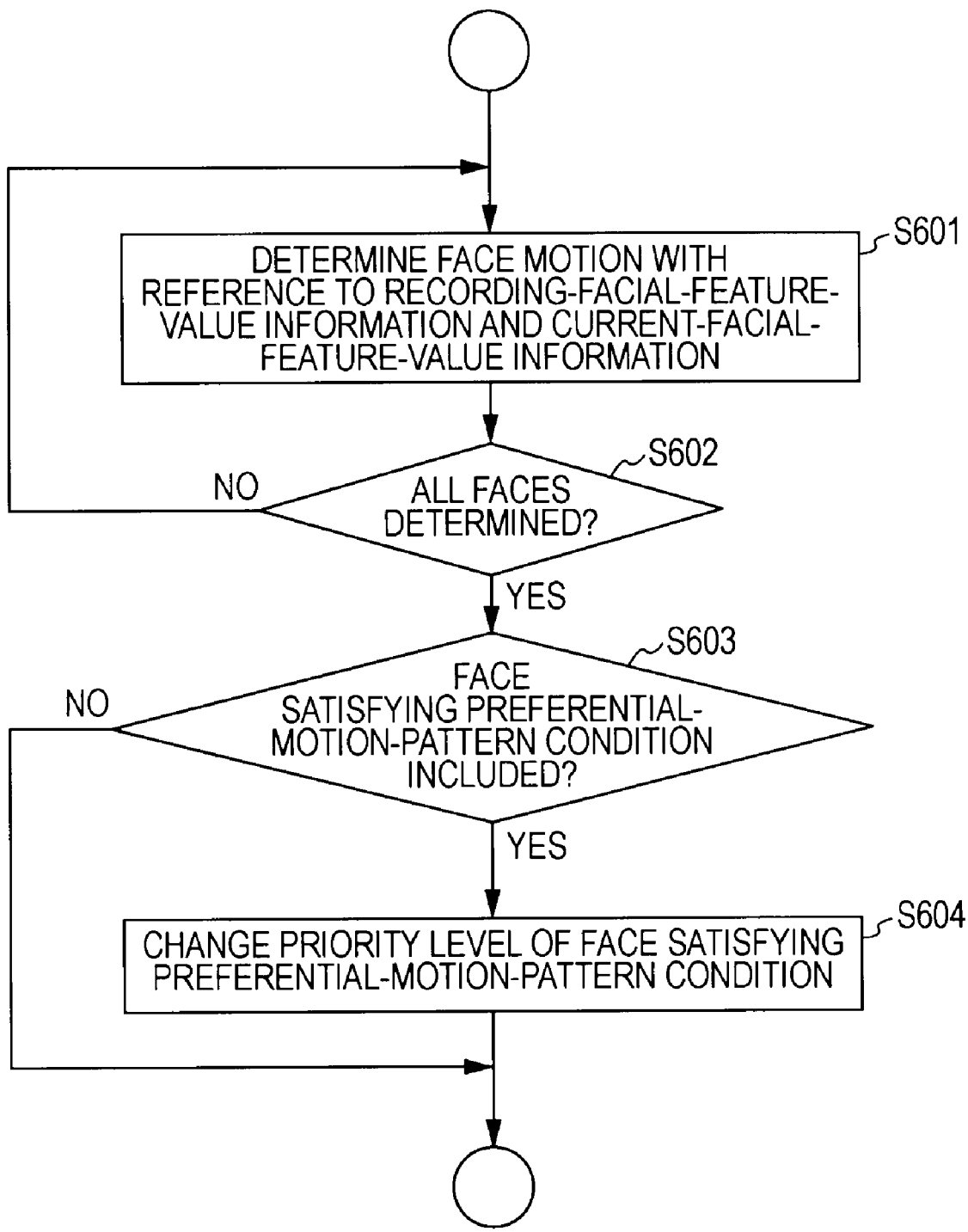
FIG. 23 is a flowchart illustrating the priority-level setting processing in the case where the facial-expression pattern is set as the priority-level setting condition.

FIG. 23 is a flowchart illustrating the priority-level evaluation processing corresponding to the operations in step S303 to step S305 of FIG. 20 in a case where a motion of a face corresponding to a specific facial gesture pattern described with reference to FIG. 12 is determined to be a preferential motion condition.

In step S601 and step S602, motions of all the faces are detected in accordance with the recording face-feature-value information and the current face-feature-value information.

Thereafter, in step S603, it is determined whether a face which performs a motion corresponding to the facial gesture pattern set as the preferential motion condition is included.

When the determination is negative in step S603, the processing of FIG. 23 is terminated and the process proceeds to step S306 of FIG. 20. On the other hand, when the determination is affirmative in step S603, the process proceeds to step S604.

In step S604, a predetermined additional value is added to a priority level of the face which is determined to satisfy the preferential motion condition of the facial gesture pattern at the current detection timing so that a high priority level is assigned to the face image.

For the operations in step S303 to step S305 of FIG. 20, any one of processing operations shown in FIGS. 21 to 23 may be employed. Furthermore, two or more processing operations from among the processing operations shown in FIGS. 21 to 23 may be used in combination so as to realize the operations in step S303 to step S305. When a plurality of priority-level setting conditions are used in combination, high reliability of the priority-level setting is attained.

Next, first to third examples of setting of parameters corresponding to a set priority level which is performed in step S112 of FIG. 16 will be described in detail.

In a first example, for a face image having a priority level higher than a predetermined level, an interval (detection time interval) before a starting time of the processing of step S101 to step S112 of FIG. 16 corresponding to one detection timing which is repeatedly performed is reduced. That is, in this case, the detection time interval serving as a parameter is changed.

When the detection time interval is reduced for the face image having a high priority level, a period of time used for recognizing a facial gesture of the face image having the high priority level can be reduced. Therefore, a result of the facial gesture recognition is quickly obtained.

In a second example, the threshold value used when a motion of a face corresponding to a preferential motion is to be detected is set changeable in accordance with priority levels.

When a motion (state) for each detection timing described with reference to FIGS. 6 and 7 is to be detected, a threshold value for detection has been set for the specific motion to be detected. For example, as for detection of the eye-closing state, first, an eye-opening degree is detected on a numeric value basis. When the numeric value representing the eye-opening degree is equal to or smaller than a threshold value, a detection result representing the eye-closing state is output. Therefore, as for the detection of the eye-closing state, the threshold value used for the determination becomes small as the priority level becomes high.

By performing such variable setting of the threshold value as a parameter, a result of a determination of a motion is obtained with ease.

Depending on capabilities of the signal processor 24 and the controller 27, in the processing corresponding to one detection timing shown in FIG. 16, the maximum number of face images to be subjected to the priority-level evaluation may be limited in practical use.

Furthermore, the priority-level evaluation may not be performed on at least one of face images in an image face in which effective face-feature-value information is detected. In this case, the priority-level evaluation is basically performed on different face images at different detection timings and this operation is circulated. For example, it is assumed that the priority-level evaluation is allowed to be performed on three face images at maximum at one detection timing, and six face images (having face IDs 1 to 6) are detected. In this case, as basic processing, the priority-level evaluation is performed on the face images having the face IDs 1 to 3 at a first detection timing, and then, the priority-level evaluation is performed on the face images having the face IDs 4 to 6 at a second detection timing. This processing is repeatedly performed. In this case, a frequency of detection (the number of detections per unit time) of a single face image is once in two detection timing, that is, ½.

In a third example, a higher detection frequency is assigned as a parameter to a face image having a priority level equal to or higher than a certain level. For example, in the example described above, for a face image having a priority level equal to or higher than the certain level, a detection frequency of 1 which is larger than ½ is set, and the priority-level evaluation is performed for each detection timing.

In this way, a result of a determination of a motion to be determined is quickly obtained.

In step S112 of FIG. 16, one of the first to third examples described above may be selected and employed, for example. Alternatively, at least two of the first to third examples are selected, and algorithm using them in combination may be employed.

By executing the operation of step S112 as described above, a processing operation in accordance with the changed parameter is performed at the next detection timing.

In each of the first to third control examples, in a state in which a plurality of face images are detected, a degree of recognizing of a facial gesture is changed for each face image in accordance with set priority levels (priority order). That is, each of the first to third control examples is processing for changing an allowance degree (determination allowance degree) of the digital still camera 1 representing the determination of the facial gesture. Then, in step S112, as a result of execution of such processing, as described hereinabove, a facial-gesture recognition accuracy is improved, and a response speed of the digital still camera 1 in response to a facial gesture pattern corresponding to a certain operation is improved, for example.

As described above, there are various possible operations instructed by a facial-gesture remote control.

As an example other than the examples described above, an example of an operation realized when the digital still camera 1 is mounted on a camera platform will be described.

As described above with reference to FIG. 1, in a state in which the digital still camera 1 is mounted on a camera platform, the digital still camera 1 and the camera platform are communicated with each other so that the digital still camera 1 can control a motion of the camera platform in a panning direction or a tilting direction. Making use of this, the digital still camera 1 controls the camera platform so as to move in the panning or a tilting direction in order to obtain a field of view for image capturing suitable for a certain composition while the operator is determined to be a photographic subject. With this configuration, not only the image capturing recording is simply performed but also photographs (still image data) of excellent compositions can be recorded.

Furthermore, as described above, part of the configuration of this embodiment is realized by executing programs using the CPU or the DSP.

Such a program is stored by being written in a ROM, for example, at a manufacturing time, or stored in a removable storage medium. Then the program is installed (updated) from the storage medium so as to be stored in a nonvolatile storage region or the flash memory 30 which complies with the DSP by installing the program from the recording medium. Furthermore, the program may be installed through a data interface such as a USB and an IEEE1394 under control of another apparatus serving as a host. Furthermore, the program is stored in the storage apparatus included in a server on a network, and is obtained by downloading the program from the server while the digital still camera 1 has a network function.

In the foregoing description, when a facial gesture pattern corresponding to a certain operation is to be recognized, a motion (state) of opening or closing of eyes and a facial inclination is used as a unit command. However, for example, the face-feature-value information shown in FIG. 18 includes information on the state of opening or closing of mouth. Therefore, the state of opening and closing of a mouth may be used as a unit command. In addition, a combination of information items of features such as an age and a gender may be used as a specific gesture pattern. By this, a configuration in which only a man or woman can perform an operation or a configuration in which only an adult or a child can perform an operation may be employed.

In the foregoing descriptions, although only a motion of a face corresponding to an operation is recognized, a motion of a body portion other than a face, such as hands, arms, legs, and a trunk, may be recognized so as to correspond to a certain operation.

In this case, when a gesture pattern obtained by combining a motion of a face and a motion of a body portion other than the face is determined to correspond to a specific operation, gesture patterns more than those in the case where only a motion of a face corresponding to an operation is recognized can be obtained. Consequently, more various remote control operations can be performed.

Furthermore, a configuration for an operation input in which a facial gesture, for example, is recognized and is accepted as an operation is applicable to an apparatus or a system other than an imaging apparatus including a digital still camera. Also in this case, an image of an operator is not necessarily obtained by real-time image capturing.

The present application contains subject matter related to that disclosed in Japanese Priority Patent Application JP 2008-242609 filed in the Japanese Patent Office on Sep. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An operation input apparatus comprising:
 body portion detection means for receiving image data obtained by image capturing and detecting a certain body portion of a photographic subject in an image corresponding to the image data;
 state determination means for determining a certain state corresponding to a priority-level setting condition, when a plurality of body portions are detected using the body portion detection means, for each body portion, the state determination means determines subject distances between the apparatus and each individual body portion;
 priority-level setting means for setting priority levels to the individual body portions in accordance with results of the determination performed by the state determination means, the priority-level setting means sets priority levels for individual body portions in accordance with the subject distances between the apparatus and each individual body portion;
 operation determination means for determining whether the body portions detected by the body portion detection means performed a predetermined motion corresponding to a certain operation in accordance with determination allowance degrees of the body portions serving as determination subjects which are set in accordance with the priority levels; and
 control means for controlling the operation input apparatus so that the operation input apparatus performs a predetermined operation in accordance with the determination that the certain motion corresponding to the certain operation has been performed which is made by the operation determination means.

2. The operation input apparatus according to claim 1, wherein the state determination means determines the subject distances on the basis of sizes of the body portions in an image frame corresponding to the image data.

3. The operation input apparatus according to claim 1, wherein the state determination means determines distances between the body portions and the center of the image frame corresponding to the image data, and the priority-level setting means sets priority levels to the body portions in accordance with the distances.

4. The operation input apparatus according to claim 1, wherein the state determination means determines motion speeds of the body portions in the image frame corresponding to the image data, and the priority-level setting means sets priority levels to the body portions in accordance with the motion speeds.

5. The operation input apparatus according to claim 1, wherein the state determination means determines whether the body portions performed a certain simple motion corresponding to a predetermined motion defined as a priority-level setting condition, and the priority-level setting means sets priority levels on the basis of the determination results.

6. The operation input apparatus according to claim 1, wherein the state determination means determines whether the body portions performed a certain motion pattern obtained by combining a plurality of certain simple motions corresponding to predetermined motions defined as priority-level setting conditions, and the priority-level setting means sets priority levels on the basis of the determination results.

7. The operation input apparatus according to claim 1, wherein the operation determination means performs determination on, among the body portions, body portions having priority levels higher than a threshold value.

8. The operation input apparatus according to claim 1, wherein time intervals between identical operation, which is repeatedly performed, for detecting body portions using the body portion detection means and executing a determination using the operation determination means for body portions having priority levels equal to or higher than a predetermined level is set smaller than those for body portions having priority levels lower than the predetermined level.

9. The operation input apparatus according to claim 1, wherein the operation determination means changes a threshold value used for determining a predetermined motion for each body portion in accordance with a priority level of the body portion.

10. The operation input apparatus according to claim 1, wherein the number of times detection of a body portion using the body portion detection means is performed and the number of times determination using the operation determination means is performed in unit time for body portions having priority levels of equal to or higher than a predetermined level are set larger than those for body portions having priority levels smaller than the predetermined level.

11. The operation input apparatus according to claim 1, wherein the operation determination means determines, when a predetermined simple motion is to be determined, whether a state corresponding to the predetermined simple motion is obtained for each detection timing with predetermined time intervals, obtains a recognition result representing that the predetermined simple motion is performed when the state corresponding to the predetermined simple motion is obtained b times in consecutive detection timings, and obtains a determination result representing that the predetermined simple motion is performed when the recognition result is obtained consecutive c times or more (c is natural number equal to or larger than 1).

12. An operation input method comprising:
receiving image data obtained by image capturing and detecting a certain body portion of a photographic subject in an image corresponding to the image data;
determining a certain state corresponding to a priority-level setting condition, when a plurality of body portions are detected, for each body portion, the determining including determining subject distances between the apparatus and each individual body portion;
setting priority levels to the individual body portions in accordance with results of the determination, the setting including setting priority levels for individual body portions in accordance with the subject distances between the apparatus and each individual body portion;
determining whether the detected body portions performed a predetermined motion corresponding to a certain operation in accordance with determination allowance degrees of the body portions serving as determination subjects which are set in accordance with the priority levels; and
controlling the operation input apparatus so that the operation input apparatus performs a predetermined operation in accordance with the determination that the certain motion corresponding to the certain operation has been performed.

13. A non-transitory computer readable medium encoded with a program which makes a processor execute a method comprising:
receiving image data obtained by image capturing and detecting a certain body portion of a photographic subject in an image corresponding to the image data;
determining a certain state corresponding to a priority-level setting condition, when a plurality of body portions are detected, for each body portion, the determining including determining subject distances between the apparatus and each individual body portion;
setting priority levels to the individual body portions in accordance with results of the determination, the setting including setting priority levels for individual body portions in accordance with the subject distances between the apparatus and each individual body portion;
determining whether the detected body portions performed a predetermined motion corresponding to a certain operation in accordance with determination allowance degrees of the body portions serving as determination subjects which are set in accordance with the priority levels; and
controlling the operation input apparatus so that the operation input apparatus performs a predetermined operation in accordance with the determination that the certain motion corresponding to the certain operation has been performed.

14. An operation input apparatus comprising:
a body portion detection unit configured to receive image data obtained by image capturing and detect a certain body portion of a photographic subject in an image corresponding to the image data;
a state determination unit configured to determine a certain state corresponding to a priority-level setting condition, when a plurality of body portions are detected using the body portion detection unit, for each body portion, the state determination unit configured to determine subject distances between the apparatus and each individual body portion;
a priority-level setting unit configured to set priority levels to the individual body portions in accordance with results of the determination performed by the state determination unit, the priority-level setting unit configured to set priority levels for individual body portions in accordance with the subject distances between the apparatus and each individual body portion;
an operation determination unit configured to determine whether the body portions detected by the body portion detection unit performed a predetermined motion corresponding to a certain operation in accordance with determination allowance degrees of the body portions serving as determination subjects which are set in accordance with the priority levels; and
a control unit configured to control the operation input apparatus so that the operation input apparatus performs a predetermined operation in accordance with the determination that the certain motion corresponding to the certain operation has been performed which is made by the operation determination unit.

15. An operation input apparatus comprising:
a body portion detection unit configured to receive image data obtained by image capturing and detect a certain body portion of a photographic subject in an image corresponding to the image data;
a state determination unit configured to determine a certain state corresponding to a priority-level setting condition, when a plurality of body portions are detected using the body portion detection unit, for each body portion, the state determination unit is configured to determine whether the body portions performed a certain motion pattern obtained by combining a plurality of certain simple motions corresponding to predetermined motions defined as priority-level setting conditions;
a priority-level setting unit configured to set priority levels to the individual body portions in accordance with results of the determination performed by the state determination unit, the priority-level setting unit is configured to set priority levels on the basis of the determination results;
an operation determination unit configured to determine whether the body portions detected by the body portion detection unit performed a predetermined motion corresponding to a certain operation in accordance with determination allowance degrees of the body portions serving as determination subjects which are set in accordance with the priority levels; and
a control unit configured to control the operation input apparatus so that the operation input apparatus performs a predetermined operation in accordance with the determination that the certain motion corresponding to the certain operation has been performed which is made by the operation determination unit.

16. An operation input apparatus comprising:
a body portion detection unit configured to receive image data obtained by image capturing and detect a certain body portion of a photographic subject in an image corresponding to the image data;
a state determination unit configured to determine a certain state corresponding to a priority-level setting condition, when a plurality of body portions are detected using the body portion detection unit, for each body portion;
a priority-level setting unit configured to set priority levels to the individual body portions in accordance with results of the determination performed by the state determination unit;
an operation determination unit configured to determine whether the body portions detected by the body portion detection unit performed a predetermined motion corresponding to a certain operation in accordance with determination allowance degrees of the body portions serving as determination subjects which are set in accordance with the priority levels; and
a control unit configured to control the operation input apparatus so that the operation input apparatus performs a predetermined operation in accordance with the determination that the certain motion corresponding to the certain operation has been performed which is made by the operation determination unit,
wherein, time intervals between identical operation, which is repeatedly performed, for detecting body portions using the body portion detection unit and executing a determination using the operation determination unit for body portions having priority levels equal to or higher than a predetermined level is set smaller than those for body portions having priority levels lower than the predetermined level.

17. An operation input apparatus comprising:
a body portion detection unit configured to receive image data obtained by image capturing and detect a certain body portion of a photographic subject in an image corresponding to the image data;
a state determination unit configured to determine a certain state corresponding to a priority-level setting condition, when a plurality of body portions are detected using the body portion detection unit, for each body portion;
a priority-level setting unit configured to set priority levels to the individual body portions in accordance with results of the determination performed by the state determination unit;
an operation determination unit configured to determine whether the body portions detected by the body portion detection unit performed a predetermined motion corresponding to a certain operation in accordance with determination allowance degrees of the body portions serving as determination subjects which are set in accordance with the priority levels; and
a control unit configured to control the operation input apparatus so that the operation input apparatus performs a predetermined operation in accordance with the determination that the certain motion corresponding to the certain operation has been performed which is made by the operation determination unit,
wherein the number of times detection of a body portion using the body portion detection unit is performed and the number of times determination using the operation determination unit is performed in unit time for body portions having priority levels of equal to or higher than a predetermined level are set larger than those for body portions having priority levels smaller than the predetermined level.

* * * * *